(12) United States Patent
Yanazume

(10) Patent No.: US 8,810,828 B2
(45) Date of Patent: Aug. 19, 2014

(54) IMAGE FORMING DEVICE, IMAGE DATA CONTROL METHOD, AND PROGRAM THEREFOR

(75) Inventor: Shinsuke Yanazume, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 858 days.

(21) Appl. No.: 12/568,942

(22) Filed: Sep. 29, 2009

(65) Prior Publication Data

US 2010/0103450 A1    Apr. 29, 2010

(30) Foreign Application Priority Data

Oct. 29, 2008   (JP) ................................. 2008-278596

(51) Int. Cl.
*G06F 3/12* (2006.01)
*G06K 15/02* (2006.01)

(52) U.S. Cl.
USPC ........................... 358/1.15; 358/1.11; 358/1.1

(58) Field of Classification Search
None
See application file for complete search history.

(56) References Cited

U.S. PATENT DOCUMENTS

| | | | | |
|---|---|---|---|---|
| 7,440,709 | B2 * | 10/2008 | Mima et al. | 399/82 |
| 7,999,958 | B2 * | 8/2011 | Matsuda | 358/1.15 |
| 8,213,036 | B2 * | 7/2012 | Ishii | 358/1.15 |
| 2008/0059616 | A1 * | 3/2008 | Shizuno | 709/222 |
| 2008/0137137 | A1 * | 6/2008 | Yamada | 358/1.15 |
| 2008/0218791 | A1 * | 9/2008 | Ishii | 358/1.15 |
| 2009/0002749 | A1 * | 1/2009 | Koyano | 358/1.15 |
| 2009/0034723 | A1 | 2/2009 | Yanazume | |
| 2009/0109471 | A1 | 4/2009 | Yanazume et al. | |
| 2009/0244616 | A1 * | 10/2009 | Kato | 358/1.15 |
| 2010/0050247 | A1 * | 2/2010 | Hashimoto | 726/10 |
| 2010/0157363 | A1 * | 6/2010 | Ishikawa et al. | 358/1.15 |
| 2010/0182640 | A1 * | 7/2010 | Daigo | 358/1.15 |

FOREIGN PATENT DOCUMENTS

| | | |
|---|---|---|
| JP | 2002-24798 | 1/2002 |
| JP | 2004-153680 | 5/2004 |
| JP | 2005-119119 | 5/2005 |
| JP | 2006-237877 | 9/2006 |

OTHER PUBLICATIONS

Office Action issued Nov. 6, 2012 in Japanese Application No. 2008-278596.

* cited by examiner

*Primary Examiner* — Marcus T Riley

(74) *Attorney, Agent, or Firm* — Oblon, Spivak, McClelland, Maier & Neustadt, L.L.P.

(57) ABSTRACT

An image forming device connectable to plural external devices controlling image data through a network including: a setup unit configured to set up an identification name and communication identification information for the image forming device and the external devices, the communication identification information having a setup content different based on a communication method; a device information control unit; a registration unit configured to associate the identification name with the communication identification information and to register these into the device information control unit; a source candidate display unit configured to display an identification name list registered in the device information control unit as candidates which can be chosen as a source of the image data; and an acquisition unit configured to acquire the image data from the plural external devices based on the communication identification information associated with the identification name.

15 Claims, 22 Drawing Sheets

FIG.5

| DOCUMENTS INFORMATION |
|---|
| DOCUMENTS NAME |
| DOCUMENTS ACCESS RIGHT |
| PAGE INFORMATION ID LIST |

| PAGE INFORMATION |
|---|
| PAGE INFORMATION ID |
| PAPER SIZE |
| IMAGE SIZE |
| RESOLUTION |
| IMAGE IDENTIFIER |

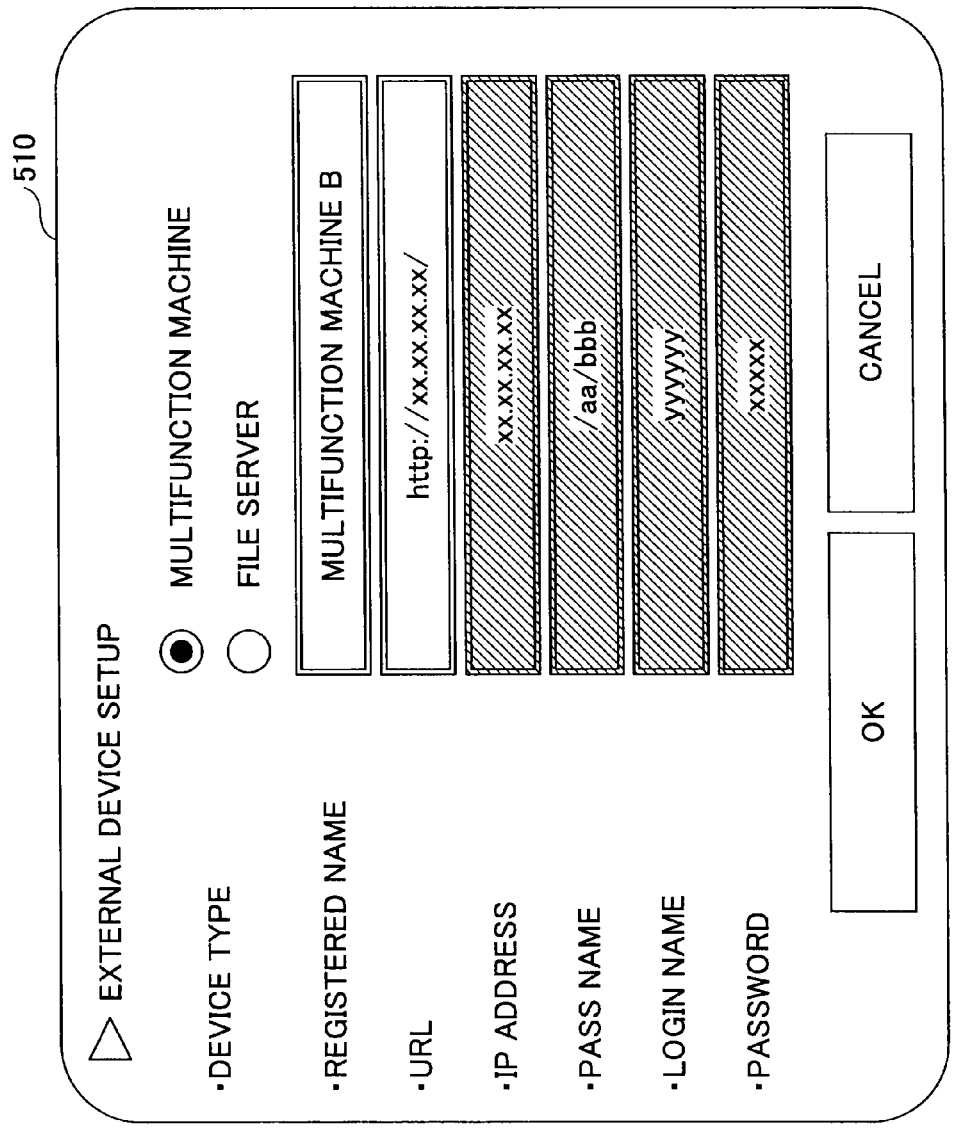

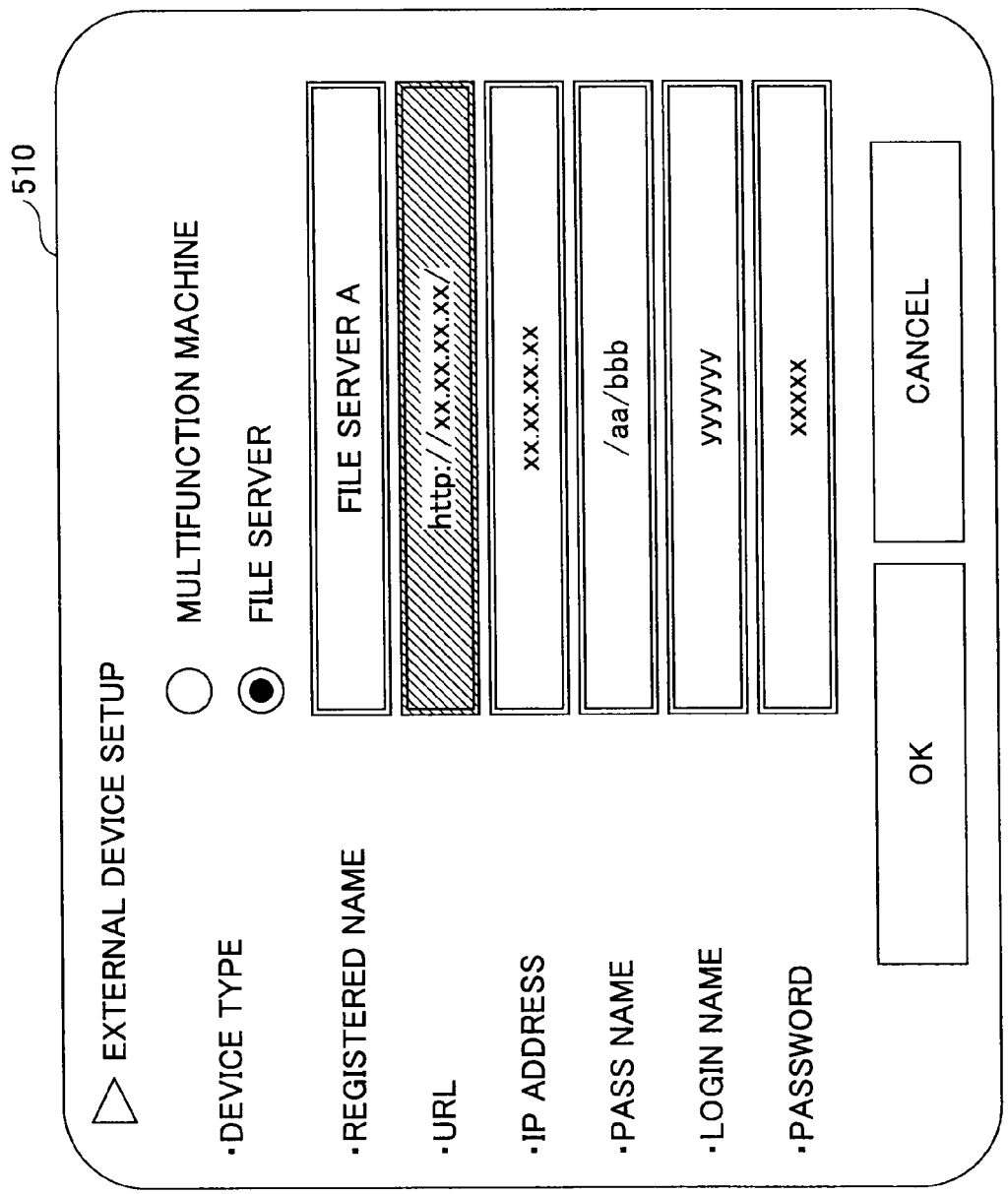

FIG.9

| DEVICE TYPE | REGISTERED NAME | URL | IP ADDRESS | PATH NAME | LOGIN NAME | PASSWORD |
|---|---|---|---|---|---|---|
| HDD | HDD | — | — | — | — | — |
| MULTIFUNCTION MACHINE | MULTIFUNCTION MACHINE B | https://BBB/xxx | — | — | — | — |
| MULTIFUNCTION MACHINE | MULTIFUNCTION MACHINE C | https://CCC/xxx | — | — | — | — |
| FILE SERVER | FILE SERVER A | — | xxx.xxx.xxx.xxx | /aaa/bbb | yyyyyy | xxxxxx |
| FILE SERVER | FILE SERVER B | — | xxx.xxx.xxx.xxx | /aaa/bbb | yyyyyy | xxxxxx |
| | | | | | | |

2231 ically relates to an image forming device, an image data control method, and a program therefor, and more specifically, to an image forming device, an image data control method, and a program therefor, that can use an external device as a save destination.

2. Description of the Related Art

Conventionally, there is a need to store image data and the like, which are read by a scanner provided in an image forming device, and to do an output operation such as printing whenever a user chooses. For this, there has been introduced an image forming device which has functions of saving inputted image data inside a memory device of the image forming device and of outputting the image data chosen by the user from a list of the image data thus stored.

Further, development of network technology enables to store image data in not only an image forming device, into which the image data are inputted, but also another image forming device or an external server (hereinafter, referred to as "external device"), which are connected to the image forming device through a network.

However, there is a problem in a conventional technique disclosed for example in Japanese Unexamined Patent Application Publication No. 2004-153680 in that an apparatus which can use image data stored in an external device is limited only to the image forming device, which originally stores the image data, and the image data cannot be shared inside a network.

There also has been a problem in Japanese Unexamined Patent Application Publication No. 2004-153680 in that control depends on differences in capabilities and functions of the external devices, based on differences in a way of handling the image data, communication method and so on. Under a circumstance where external devices having various capabilities and functions are mixed, there is a problem that a user must voluntarily pay attention to the differences in the external devices in operating the external devices, or that a save destination of the image data is limited to only an external device having a specific capability or function.

SUMMARY OF THE INVENTION

Embodiments of the present invention provide a novel and useful image forming device, image data control method, and a program therefor, solving one or more of the problems discussed above.

One aspect of the present invention may be to provide an image forming device connectable to a plurality of external devices controlling image data through a network, the image forming device including: a setup unit configured to set up an identification name and communication identification information for the image forming device and each of the plurality of external devices, the communication identification information of the image forming device and each of the plurality of external devices having a setup content that is different based on a communication method of the respective informa- tion forming device and the plurality of external devices; a device information control unit; a registration unit configured to associate the identification name with the communication identification information and to register the identification name and the communication identification information into the device information control unit; a source candidate display unit configured to display a list of the identification names registered in the device information control unit as candidates which can be chosen as a source of the image data; and an acquisition unit configured to acquire the image data from one or more of the plurality of external devices based on the communication identification information associated with the identification name chosen as the candidate from the list.

A second aspect of the present invention may be to provide 4. An image forming device connectable to a plurality of external devices controlling image data through a network, the image forming device including:

a setup unit configured to set up an identification name and communication identification information for the image forming device and each of the plurality of external devices, the communication identification information of the image forming device and each of the plurality of external devices having a setup content that is different based on a communication method of the respective information forming device and the plurality of external devices; a device information control unit; a registration unit configured to associate the identification name with the communication identification information and to register the identification name and the communication identification information into the device information control unit; a save destination candidate display unit configured to display a list of the identification names registered in the device information control unit as candidates which can be chosen as a save destination of the image data; and a sending unit configured to send a request for saving the image data to one or more of the plurality of external devices based on the communication identification information associated with the identification name chosen as the candidate from the list.

According to the image forming device, it is possible to improve a convenience in handling image data when an external device is used as a save destination the image data.

Additional objects and advantages of the embodiments will be set forth in part in the description which follows, and in part will be obvious from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 5 is a view showing a configuration example of documents information and page information.

FIG. 8 shows an example of displaying an external device setup screen.

FIG. 9 shows a configuration example of a device setup information control screen.

DETAILED DESCRIPTION OF THE PREFERRED EMBODIMENTS

A description is given below, with reference to FIG. 1 through FIG. 21 of embodiments of the present invention.

Figure 1:
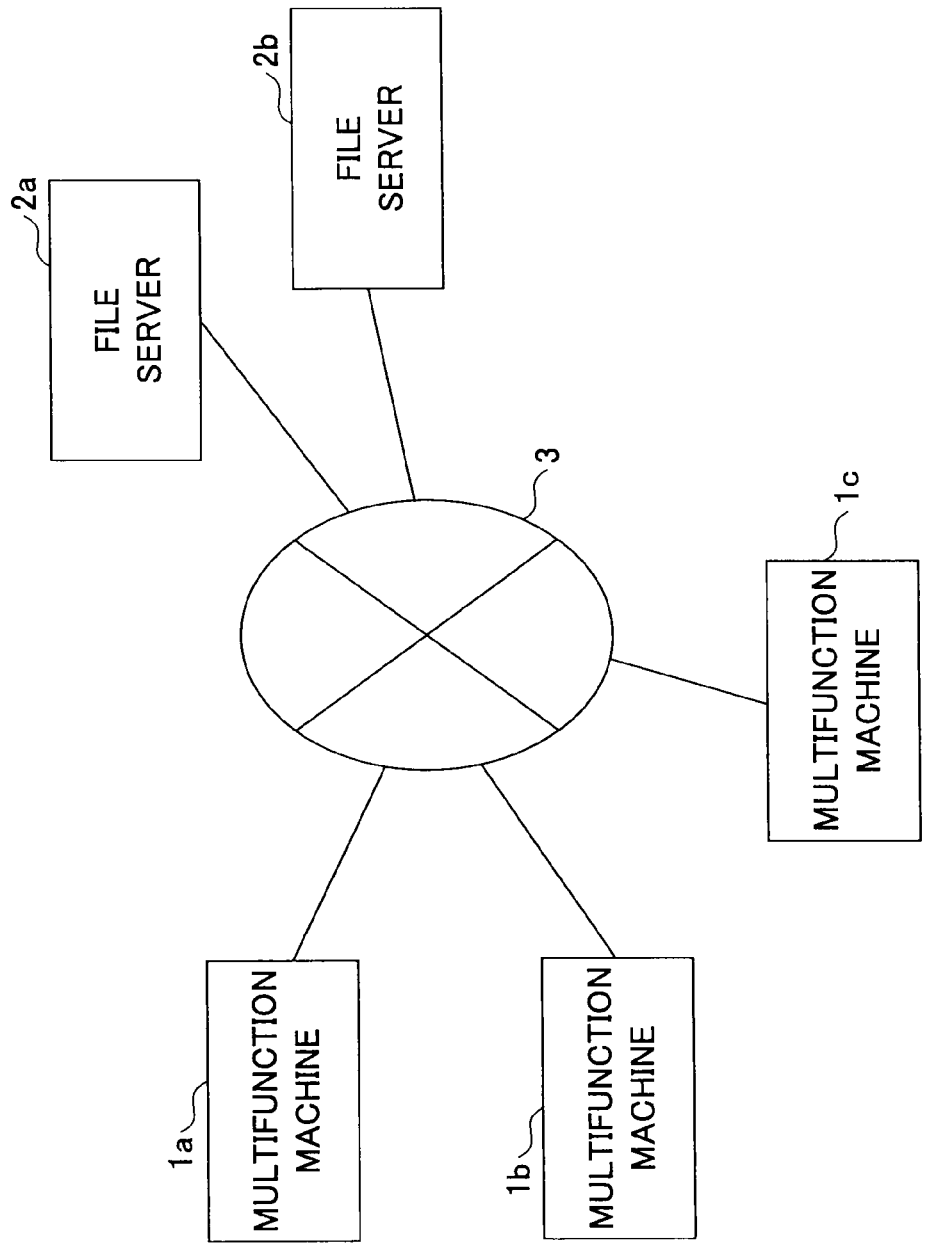
FIG. 1 is a view schematically showing a system configuration example according to an embodiment of the present invention.

FIG. 1 is a view schematically showing a system configuration example according to an embodiment of the present invention.

In this figure, multifunction machines 1a, 1b and 1c (hereinafter, generically referred to as "multifunction machine 1") and file servers 2a and 2b (hereinafter, generically referred to as "file server") are connected through a network 3 such as a local area network (LAN), a wide area network (WAN), and an internet (which can be wired or wireless). Hereinafter, the multifunction machines 1, file servers 2 and the like are collectively referred to as "devices".

The multifunction machine 1 is an example of an image forming device according to this embodiment, and works as an image forming device that can realize functions of a printer, a scanner, a fax machine and so on using only one casing. Each of the multifunction machines 1 has a function of accumulating image data and bibliographic information thereof.

The file server 2 is a general purpose computer. In the embodiment, the file server 2 controls the image data and the bibliographic information in a file system, provided by an operating system (OS).

In the present embodiment, the image data and so on are distributed between the multifunction machines 1 or between the multifunction machine 1 and the file server 2. By this, it is possible for a multifunction machine 1 to utilize the image data controlled by another multifunction machine 1 or a file server 2.

Figure 2:
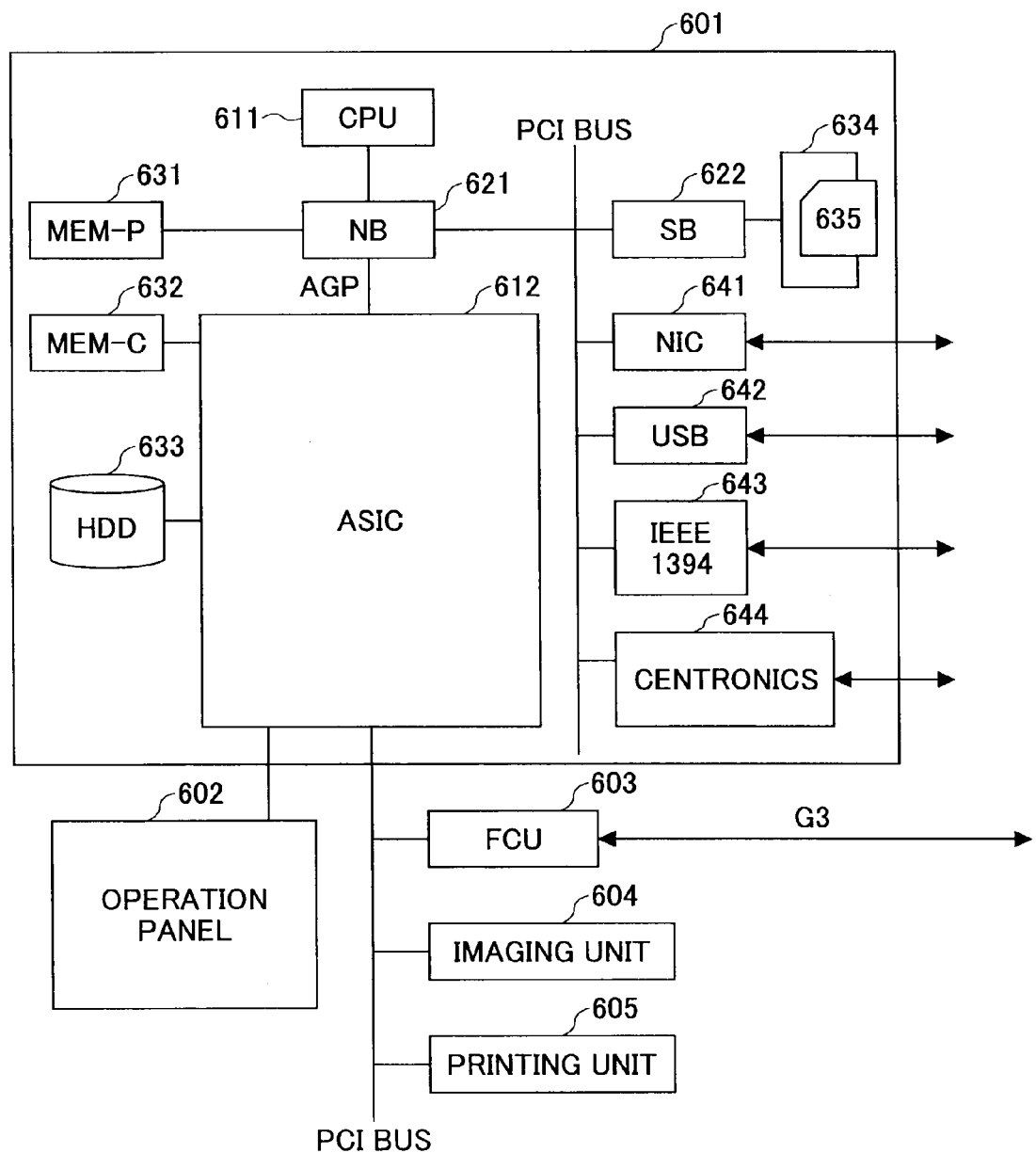
FIG. 2 is a view schematically showing an example of a hardware configuration of an image forming device according to the embodiment of the present invention.

FIG. 2 shows an example of a hardware structure of an image forming device according to the present invention.

There are a controller 601, an operation panel 602, a facsimile control unit (FCU) 603, an imaging unit 604, and a printing unit 605.

The controller 601 is made up of a CPU 611, an ASIC 612, an NB 621, an SB 622, an MEM-P 631, an MEM-C 632, a hard disk drive (HDD) 633, a memory card slot 634, a network interface controller (NIC) 641, a USB device 642, an IEEE 1394 device 643, and a Centronics device 644.

The CPU 611 is an IC for various information processes. The ASIC 612 is an IC for various image processes. The NB 621 is the north bridge of the controller 601. The SB 622 is the south bridge of the controller 601. The MEM-P 631 is a system memory of the multifunction machine 1. The MEM-C 632 is a local memory of the multifunction machine 1. The HDD 633 is a storage of the multifunction machine 1. The memory card slot 634 is a slot for setting up a memory card 235. The NIC 641 is a controller for network communication using a MAC address. The USB device 642 is a device for providing a connection terminal of the standard USB. The IEEE 1394 device 643 is a device for connecting a connection terminal of the standard IEEE 1394. The Centronics device 644 is a device for providing a connection terminal of the specification of Centronics.

Figure 3:
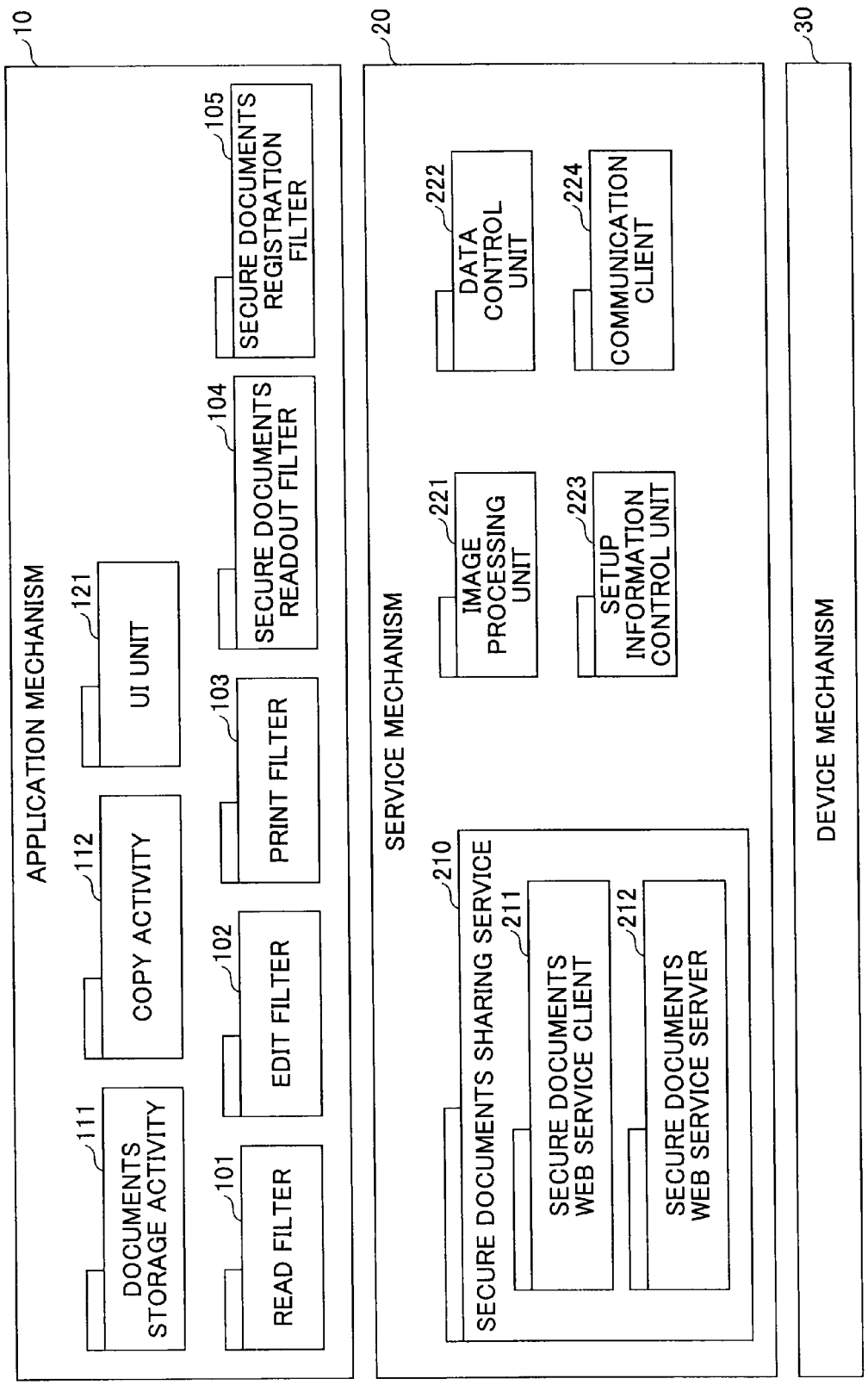
FIG. 3 is a view schematically showing an example of a software configuration according to the embodiment of the present invention.

FIG. 3 is a view showing an example of software configuration of the image forming device according to an embodiment of the present invention. As shown in FIG. 3, software in the multifunction machine 1 is classified by layers such as an application mechanism 10, a service mechanism 20, and a device mechanism 30. The hierarchical relationship among the layers is based on a relationship of calling the layers. In other words, a higher layer basically reads out a lower layer in FIG. 3.

The application mechanism 10 is a layer on which a group of software parts (programs) permitting a user to use resources such as functions and information (data) provided by the multifunction machine, are mounted. In FIG. 3, the application mechanism 10 includes a read filter 101, an edit filter 102, a print filter 103, a secure documents readout filter 104, a secure documents registration filter 105, a documents storage activity 111, a copy activity 112, an UI unit, and so on.

The software parts having a name like "XXX filter" are generically referred to as "filter". Each of the filters is a software part that carries out a part of a job. Each of the filters cannot individually carry out a job. An application carrying out a job is configured by connecting a plurality of filters.

The read filter 101 controls to read image data by the imaging unit 604 (e.g. a scanner) and outputs the image data thus read as a deliverable (a processing result). The print filter 103 outputs (prints) input data to the printing unit 605 (a plotter). The secure documents readout filter 104 reads out the documents data saved in the multifunction machine and outputs the documents data thus readout as a deliverable. The secure documents registration filter 105 saves (perpetuates) the image data thus read as documents data in a designated save destination. Hereinafter, "perpetuate" or "perpetuate image data" typically means "save page information, document information, other bibliographic information of an image file including image data, these informations being used to save or read out the image data in or from a device (e.g. a multifunction machine and a file server) other than a device itself by the device itself.

In the embodiment, a real world concept "documents data" is virtually realized. An example of documents data may include a plurality of image data (ordinarily, the image data are made up of a number of pages). The structure of the documents data will be described later.

Software parts having a name like "XXX activity" are generically referred to as "activity". An activity is a software part that controls an order of connecting a plurality of filters and carries out a job by making the filters work in that order. Basically, one application is carried out by one activity.

The documents storage activity 111 carries out a job of storing the image data (the image data thus read out by the imaging unit 604) as documents data into a designated save destination of the image data, using the read filter 101, the edit filter 102, the secure documents registration filter 105, and so on.

The UI unit 121 displays an operation screen on an operation panel 602 regarding the activity and filter, or sets attribute information (setup information with respect to a job) of the activity, the filter or the like, which is inputted through the operation screen.

The service mechanism 20 is a layer on which a software part (program) providing a basic service for use by an activity, filter or the like is mounted. The service mechanism 20 thereby provides a scheme independent from a specification of hardware such as a model. In FIG. 3, the service mechanism 20 includes a secure documents sharing service 210, an image processing unit 221, a data control unit 222, a setup information control unit 223, and a communication client 224, for example.

The secure documents sharing service 210 provides the application mechanism 10 (the secure documents readout filter 104 and the secure documents registration filter 105 in the embodiment) with functions such as storage and reading of the documents data. By the secure documents sharing service 210, it is possible to absorb a difference in handling documents data and a difference in communicating the documents data, the differences being caused corresponding to the save destinations. In other words, a user (the secure documents readout filter 104 and the secure documents registration filter 105) of the secure documents sharing service 210 may simply request storage or acquisition of the image data with respect to the secure documents sharing service 210, without paying attention to differences in handling the documents data corresponding to the save destination In the embodiment, the differences in handling the documents data corresponding to the save destination means differences of actions in storing and acquiring the documents data based on whether a structure of the documents data is already known. In the embodiment, each of the multipurpose complex machines 1 knows a structure of the documents data. On the other hand, the file server 2 does not know the structure of the documents data.

The secure documents sharing service 210 includes a secure documents web service client 211 and a secure documents web service server 212. The secure documents web service server 212 saves the documents data into an device itself and publicly releases an interface (a method by a remote procedure cell (RPC) of Simple Object Access Protocol (SOAP)) that relates to storage and the acquisition of the documents with respect to the device itself, the network 3. The secure documents web service client 211 saves the documents data in other machine (the multifunction machine other than the own machine) or acquires the documents data from the other machine by remotely calling a method provided by the secure documents web service server 212 of the other machine (multifunction machine 1 other than the device itself (the own multifunction machine).

The image processing unit 221 generates image data based on information scanned by the imaging unit 604. A data control unit 222 controls the documents data structure and documents data control form. The data control unit 222 knows the structure and the documents data control form, and saves or reads out the documents data. The setup information control unit 223 controls attribute information (mainly, information for communication) which is set up respectively by save destinations for the documents data. The communication client 224 functions as a communication means for communicating with the file server 2.

The device mechanism 30 includes a control means for controlling the devices respectively of the multifunction machines 1.

Figure 4:
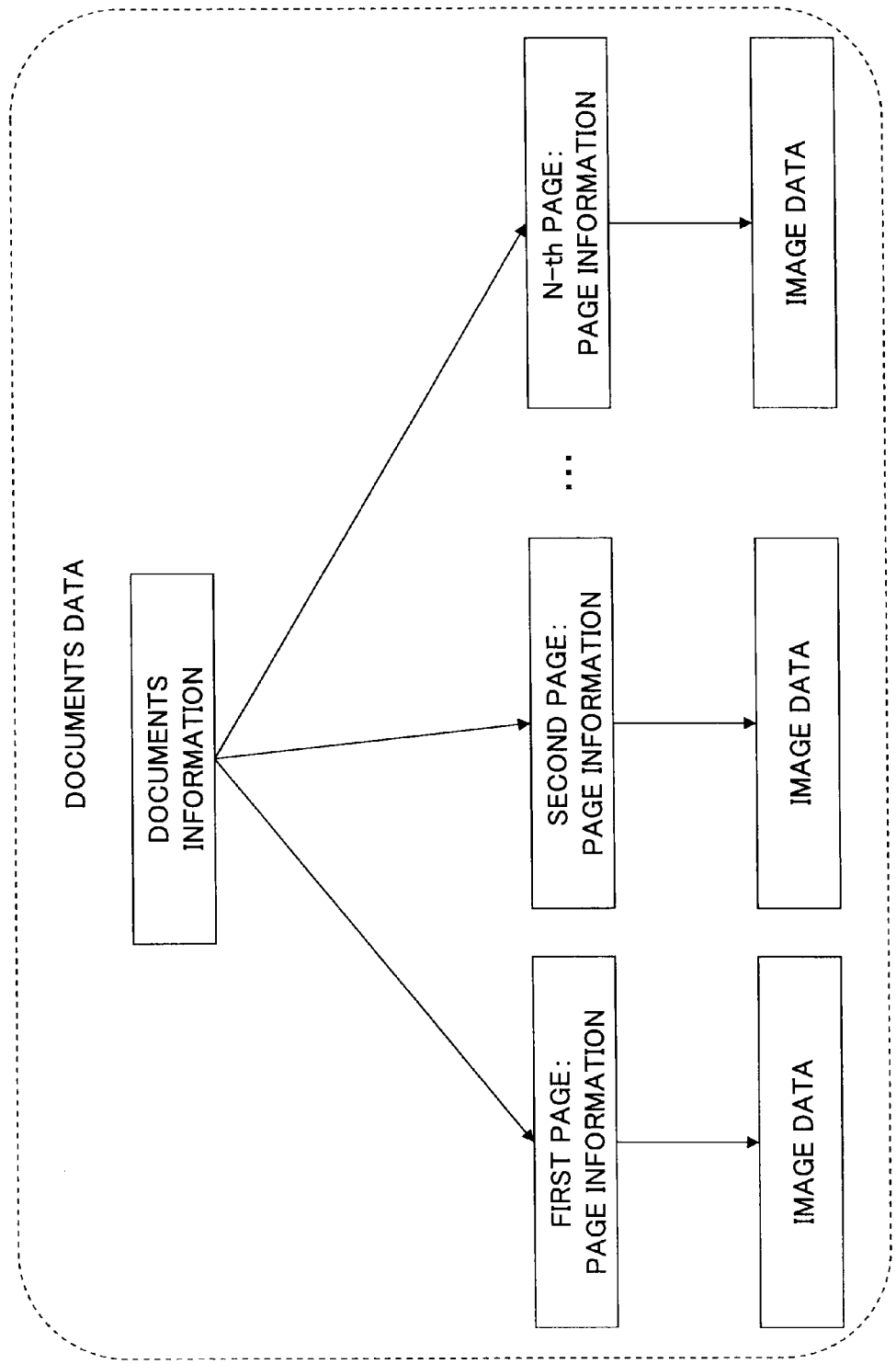
FIG. 4 shows a configuration example of documents data according to the embodiment of the present invention.

FIG. 4 shows a configuration example of documents data according to the embodiment of the present invention.

As shown in FIG. 4, an exemplary documents data is made up of one documents information, page information by the number of pages, and image data by the number of image data. The documents information is bibliographic information about the documents data. The page information is bibliographic information about a page (image data).

FIG. 5 is a view showing a configuration example of documents information and page information. As shown in FIG. 5, the documents information includes a documents name, a documents access right, a page information ID list and so on. The documents name is a name of the documents data. The documents access right is access control information with respect to the documents data. The page information ID list is a list of page information IDs of respective page informations included in the documents data. In this regard, the documents information is associated with one or more page informations by the page information ID list.

An exemplary page information includes a page information ID, a paper size, an image size, a resolution, an image identifier, and so on. The paper size is that of a corresponding page. The image size is a data size of the corresponding image data. The resolution is that of the corresponding image data. The image identifier is identification information of the corresponding image data (see FIG. 4). It is possible to associate the page information with the image information by the image identifier. For example, the image identifier may be a path name of a file that saves the image data.

Figure 6:
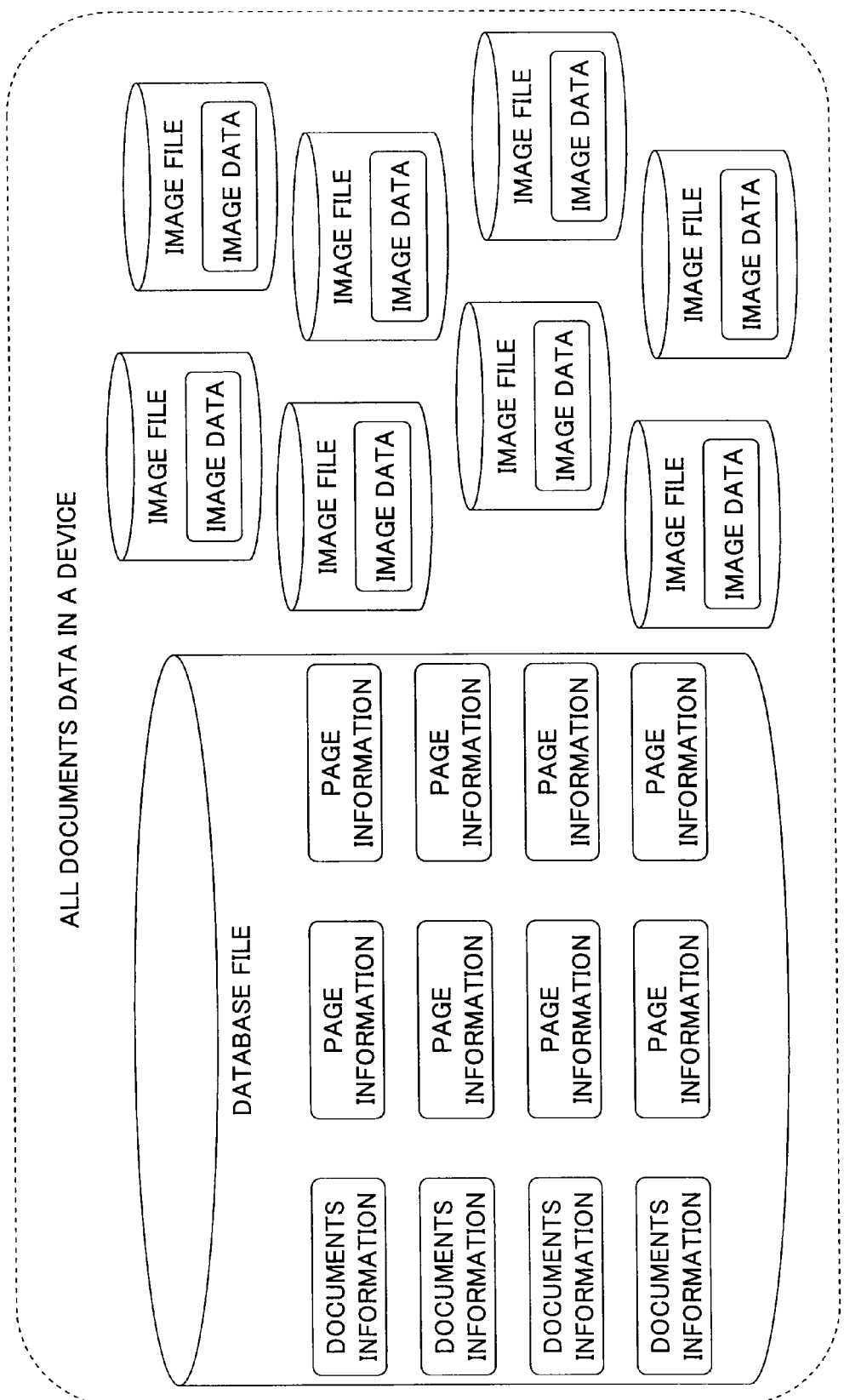
FIG. 6 shows a configuration in controlling documents data according to the embodiment of the present invention.

FIG. 6 shows the documents data control form according to the embodiment of the present invention. In devices (e.g. the multifunction machines 1 and the file server 2) controlling the documents data, the documents data are controlled in a mode shown in FIG. 6.

Documents data and page information controlled by a device are saved in a file (hereinafter, referred to as a "database file"). A database file is included in each machine controlling the documents data. The format of the database file may be a text format or a binary format. It is sufficient that formats are the same between the devices. Image data belonging to the respective documents data is saved in respective different files (image files). Accordingly, each of the devices controlling the documents data has image files by the number of the image data, belonging to the documents data controlled by the device. Here, the database file may also be divided for each documents information or for each page information.

Figure 7:
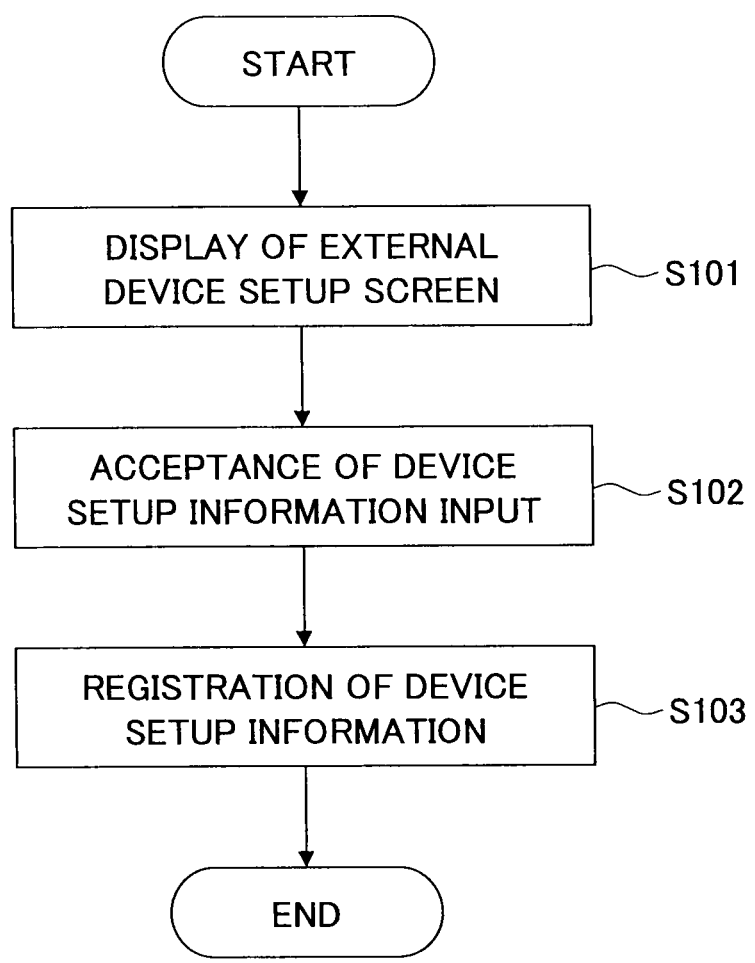
FIG. 7 is a flow diagram explaining a procedure of a pre-configuration process.

Hereinafter, a procedure of processing in the multifunction machine 1 will be described. FIG. 7 is a flow diagram for explaining a procedure of a preconfiguration process. The process in FIG. 7 is carried out by each multifunction machines that associates with another device (a multifunction machine 1 or a file server 2) expected to associate to control documents data. Here, the expression of "associates with the another device" means that image data inputted into the multifunction machine 1 are saved in the other device as documents data, or documents data saved in the other device are used (printed or otherwise disposed of) in the multifunction machine 1. In the following, such the other device is referred to as an "external device".

First, in response to an instruction inputted by a user through an operation panel 602, the UI unit 121 makes the external device setup screen display on the operation panel 602 (S101).

FIG. 8 is an example of an external device setup screen. As shown, the external device setup screen 510 is enabled to set a device type, a registered name, a uniform resource locator (URL), an internet protocol (IP) address, a path name, a login name, a password and so on. These are mainly information (communication identification information) to communicate with the external device.

The device type designates whether the external device to be set up is the multifunction machine 1 or the file server 2. A radio button for selecting the multifunction machine 1 or the file server 2 is disposed on the external device setup screen 510. The inputting of other setup items depends on the device type. This is because usable communication methods between the multifunction machine 1 and the file server 2 are different. In the present embodiment, a communication among the multifunction machines is done by a SOAP on a hypertext transfer protocol (HTTP). Further, a communication between the multifunction machine 1 and the file server 2 is done by a general communication method such as a file transfer protocol (FTP) and a server message block (SMB).

FIG. 8A shows a state that the multifunction machine 1 is selected as device type. In this case, the setup items of a registered name and a URL are enabled to input, and the other setup items are grayed to prevent input. FIG. 8B shows a state in which a file server 2 is selected as the device type. In this case, a registered name, an IP address, a path name, a login name and a password are enabled to be input, and a URL is grayed to prevent input.

The registered name of an external device to be set up is an identified name of the external device. A destination to register the documents data, a source and so on are chosen by the registered name. The URL is the designation of the multifunction machine 1 to be set up. The IP address is the address of the file server 2 to be set up. The path name is the name of a folder storing the documents data in the file server 2 to be set up. The login name and the password are used for logging into the file server 2 to be set up.

When information for setting up the device (device setup information) is set up and an OK button is selected on the external device setup screen 510 (S102), the UI unit 121 notifies the setup information control unit 223 of the device setup information thus set up. Subsequently, the setup information control unit 223 registers the device setup information thus notified into a device setup information control table in the HDD 633 (S103).

FIG. 9 is a configuration example of a device setup information control table. As shown in FIG. 9, the device setup information control table 2231 has a structure that the device setup information, which has been set up on the external device setup screen 510, can be set up as is. For example, a second record (second row) in the table registers device setup information concerning the multifunction machine 1b so that the registered name becomes "multifunction machine B". Further, a fifth record (fifth row) in the table registers device setup information concerning the file server 2b registered so that the registered name becomes "file server B". As such, a plurality of device setup informations can be registered in one of the multifunction machines 1. Accordingly, a multifunction machine 1 can be associated with the plurality of external devices. In this, a first record is a record that is previously registered in correspondence with the device itself, e.g. the multifunction machine 1. A record of the device itself includes a device type and a registered name of "HDD".

On the basis of the above process, the following processes can be carried out. According to the embodiment, a process of filing the documents data and a process of acquiring the documents data are respectively described in cases where another multifunction machine 1, a file server 2, and an device itself are the save destination or source.

First, the process of storing the documents data is described. In the embodiment, an example of storing the documents data in a scanning job will be described. However, the process of storing the documents data can be utilized in common with various jobs other than a scan job. The scan job is controlled by the documents storage activity 111.

Figure 10:
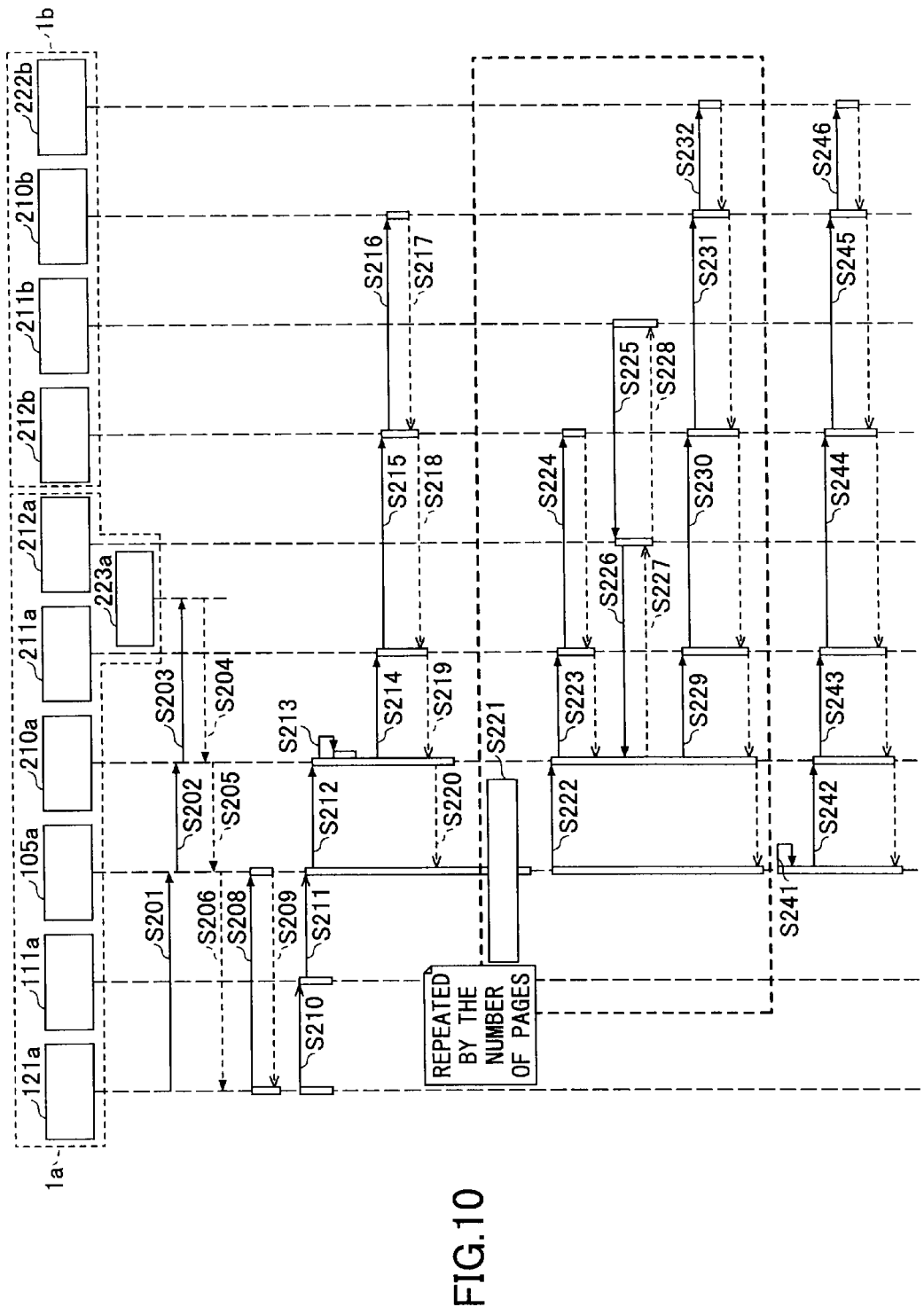
FIG. 10 is a sequence diagram explaining a process of storing documents data into another multifunction machine.

FIG. 10 is a sequence diagram for explaining a process of storing documents data in another multifunction machine. An example in which documents data of image data scanned by the multifunction machine 1a are saved in the multifunction machine 1b will be described. To avoid confusion, numerical references to the multifunction machine 1a are identified with a suffix of "a", and those included in the multifunction machine 1b have a suffix of "b".

In FIG. 10, a numerical reference 121a designates the UI unit of the multifunction machine 1a; 111a does documents storage activity 111a; 105a does a secure documents registration filter; 210a does a secure documents sharing service; 211a does a secure documents web service client; and 212a does a secure documents web service server. Further, a numerical reference 212b designates a secure documents web service server of the multifunction machine 1b; 211b does a secure documents web service client; 210b does a secure documents sharing service; and 222b does a data control unit 222. Further, steps S201 and S202 designate acquisition of a device list; S203 does acquisition of setup information; S204 designates a flow of setup information; S205 and S206 do a flow of a registered name list; S208 does a choice of save destination; S210 and S211 do a flow of job start; S212 does a flow of checking whether documents data can be saved; S213 does determination of a device type; S214 to S216 do checking whether a device can be used; S217 to S220 do a flow of a result of the determination; S221 does a readout of image data; S222 does perpetuation of image data; S224 does a request of acquiring the image data; S225 and S226 do acquisition of the image data; S227 and S228 do a flow of the image data; S229 to S232 do perpetuation of page information; S241 does generation of documents information; and S242 to S246 do perpetuation of documents information.

In the multifunction machine 1a, when a scan job is chosen as an object to be processed by a user via an operation panel 602, the UI unit 121a makes an operation screen (a screen for scanning) display on the operation panel 602. It is possible to set up attribute information respectively for a read filter 101a, an edit filter 102a, and a secure documents registration filter 105a, which are utilized by a documents storage activity 111a, on the screen for scanning. Further the edit filter 102a is configured to perform a functions such as aggregation, enlargement, and reduction of the image data thus read. Furthermore, the secure documents registration filter 105a is configured to have a documents name, an access right, and a save destination.

Some of attribute informations of each of the filters require a screen transition for setting up a value in the filters. One of such screen transitions is a setup of the save destination in the secure documents registration filter 105. For example, when a button for the save destination is selected on the screen for scanning, the UI unit 121a requests the secure documents registration filter 105a to send a list of devices usable as the save destination (S201). The secure documents registration filter 105a notifies the request to the secure documents sharing service 210a of the request (S202). The secure documents sharing service 210a requests the setup information control unit 223a to acquire device setup information, in response to the request (S203). The setup information control unit 223a acquires the device setup information from a device setup information control table 2231 and returns it to the secure documents sharing service 210a (S204). The secure documents sharing service 210a saves the thus returned device setup information in a MEM-C 632 (hereinafter, referred to as "memory") and returns a list of registered names, which are registered in the device setup information, to the secure documents registration filter 105a (S205). The secure documents registration filter 105a returns the list of the registered names to the UI unit 121a (S206). The UI unit 121a generates a screen for designating a save destination using the list of registered names and makes the screen for designating the save destination display on the operation panel 602.

Figure 11:
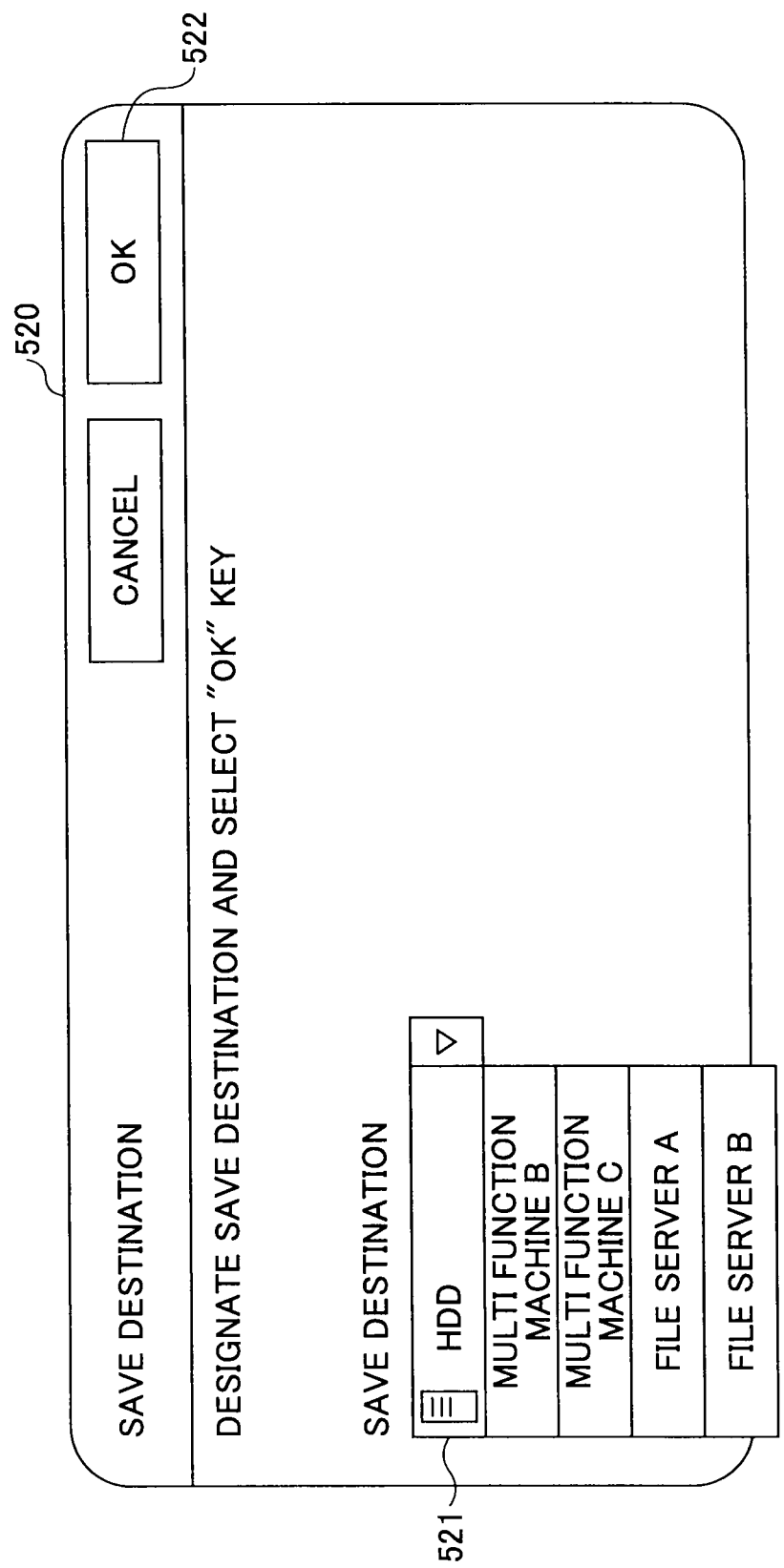
FIG. 11 is an example of a screen designating a save destination.

FIG. 11 is an example of a display screen 520 designating the save destination. The screen 520 for designating the save destination is provided to allow a user to designate (select) the save destinations for saving the image data that has been scanned. A list box 521 displays a list of the registered names of the save destinations as candidates on the screen for designating the save destinations 520.

When the multifunction machine 1b (the multifunction machine B) is chosen from the list box 521 and an OK button 522 is selected by the user, the UI unit 121 records the registered name thus selected in the secure documents registration filter 105a as the registered name of the save destinations (S208, S209) as is shown in FIG. 10. In S209, the setup is confirmed.

After the attribute informations are completely set up and a start button on an operation panel 602 is selected, the UI unit 121a requests the documents storage activity 111a to start the scan job (S210). An original to be scanned should be properly placed in the multifunction machine 1 by a time when the start button is selected.

In response to the start request of the scan job, the documents storage activity 111a notifies various filters (the read filter 101a, the edit filter 102a, and the secure documents registration filter 105a) of the start of the scan job. In FIG. 10, only notification (S211) of starting the scan job to the secure documents registration filter 105a is shown for reasons of expediency.

The filters notified to start the scan job start to process the scan job, which can be carried out in parallel. In the example, an initialization process is carried out on the filters when necessary and then a filter waits for an input from a filter in a previous stage is. Here, the expression of "filter in a previous stage" means a filter located relatively earlier in the connection relationship of the filters. In the example, the connection relationship is established in the order of the read filter 101a, the edit filter 102a, and the secure documents registration filter 105a during the scan job. Accordingly, the edit filter 102a waits for an input from the read filter 101a after an initialization process carried out on the read filter. The secure documents registration filter 105a waits for an input from the edit filter 102a after an initialization process carried out on the edit filter 105a. A leading filter in this connection relationship (the read filter 101a in the above example) initiates the scan job process by reading the image data.

Referring again to FIG. 10, the initialization process of the secure documents registration filter 105a is shown. After the secure documents registration filter 105a receives notification of starting the scan job, it requests the secure documents sharing service 210a to check whether the documents data can be saved in the device identified by the registered name (hereinafter, referred to as use device) in step S212. The secure documents registration filter 105a searches information of the device setup information corresponding to the registered name as a parameter, and determines the type of device of the use device is "HDD", "multifunction machine", or "file server" based on the device setup information thus searched (S213). Then, the secure documents sharing service 210a acquires an URL from the device setup information of the use device and requests a secure documents web service client 211a to check whether the multifunction machine 1b corresponding to the URL can be used based on the URL, which is designated as a parameter (S214). The secure documents web service client 211a sends a simple object access protocol (SOAP) request, which indicates a request of checking whether the multifunction machine 1b can be used, to the URL as the parameter, and remotely cells a check method of whether the secure documents web service server 212b of the multifunction machine 1b can be used (S215).

The secure documents web service server 212b requests a secure documents sharing service 210b to check whether the documents data can be saved in response to the call by the check method based on the SOAP request (S216). The secure documents sharing service 210b determines whether the documents data can be saved based on a state of the multifunction machine 1b (for example, an amount of space in the HDD 633), and then returns a result of the determination to the secure documents web service server 212b (S217). The result of the determination is returned to the secure documents web service client 211a by the secure documents web service server 212b as a SOAP response (S218).

The secure documents web service client 211a returns the result of the determination included in the SOAP response to the secure documents sharing service 210a after receiving the SOAP response (S219). The secure documents sharing service 210a returns the result to the secure documents registration filter 105a (S220). In a case where the result shows the use device can be used, the secure documents registration filter 105a waits for input from the edit filter 102a (not shown for reasons of expediency).

In FIG. 10, the image data of a page are read by the read filter 101a, and edit of the image data by the edit filter 102a and the association of the image data with the page information by the secure documents registration filter 105a are not specifically shown and are represented by step S221. The page information for a page is inputted into the secure documents registration filter 105a by carrying out step S221. A detailed description of step S221 will be described later.

After step S221, the secure documents registration filter 105a requests the secure documents sharing service 210a to perpetuate (steadily save) the page information for the image data thus read (S222). The secure documents sharing service 210a requests the secure documents web service client 211a to carry out a request of draw the image data in the multifunction complex device 1b using the URL and an image identifier included in the page information of the use device, as a parameter (S223). Here, the request of drawing the image data makes the multifunction complex device 1b draw the image data thus read. The secure documents web service client 211a issues a remote call for a method of requesting to draw the image data of the secure documents web service server 212b by sending a SOAP request indicative of the request of acquiring the image data to the URL designated as the parameter (S224).

The secure documents web service client 211b sends a request to the secure documents web service server 212a of the multifunction machine 1a to acquire the image data using the image identifier as a parameter, in response to a call for a method of requesting to acquire the image data based on the SOAP request (S225). The secure documents web service server 212a notifies the secure documents sharing service 210a of a request to acquire the image data along with the image identifier (S226). Subsequently, the secure documents sharing service 210a acquires the image data based on the image identifier and returns the image data to the secure documents web service client 211b of the multifunction machine 1b via the secure documents web service server 212a (S227, S228). The secure documents web service client 211b saves the image data thus received into a memory area inside the HDD 633 of the multifunction machine 1b.

Subsequently, the secure documents sharing service 210a requests the secure documents web service client 211a to perpetuate the page information using the URL of the use device and the page information as a parameter (S229). The secure documents web service client 211a issues a remote call for a method of perpetuating the page information of the secure documents web service server 212b by sending a SOAP request indicative of a request to perpetuate the page information (S230).

The secure documents web service server 212b requests the secure documents sharing service 210b to perpetuate the page information in response to the call by the method of perpetuating the page information based on the SOAP request (S231). The secure documents sharing service 210b requests a data control unit 222b to perpetuate the page information (S232). In a case where the image identifier is used as a path name of an image data file including image data, the secure documents sharing service 210b rewrites the image identifier inside the page information to be a path name corresponding to the above memory area, where the image data have been saved by the secure documents web service client 211b. Subsequently, the data control unit 222b registers the page information into the database file saved in the HDD 633 of the multifunction machine 1b. Because the data control unit 222b knows the type of database file recorded in it, the database file can be updated (e.g. registration of the page information and registration of the documents information to be described later).

Steps S221 to S232 (e.g. scanning, perpetuating the image data, and perpetuating the page information) are repeated by the number of pages subject to the scan. After the perpetuation of the image data, that of the page information, and so on are completed, the secure documents registration filter 105a creates documents information corresponding to the original (a paper document) that has been scanned (S241). A page information ID of each page information that has been perpetuated is registered in the documents information.

Subsequently, the secure documents registration filter 105a requests the secure documents sharing service 210a to perpetuate the documents information thus created (S242). The secure documents sharing service 210a requests the secure documents web service client 211a to perpetuate the documents information using the URL and documents information of the use device as a parameter (S243). The secure documents web service client 211a issues a remotely call for a method of perpetuating the documents information of the secure documents web service server 212b by sending a SOAP request indicative of a request to perpetuate the documents information (S244).

The secure documents web service server 212b requests the secure documents sharing service 210b to perpetuate the documents information in response to a call for the method of perpetuating the page information based on the SOAP request (S245). The secure documents sharing service 210b requests the data control unit 222b to perpetuate the documents information (S246). Subsequently, the data control unit 222b registers the documents information into the database file, which is saved in the HDD 633 of the multifunction machine 1b.

Figure 12:
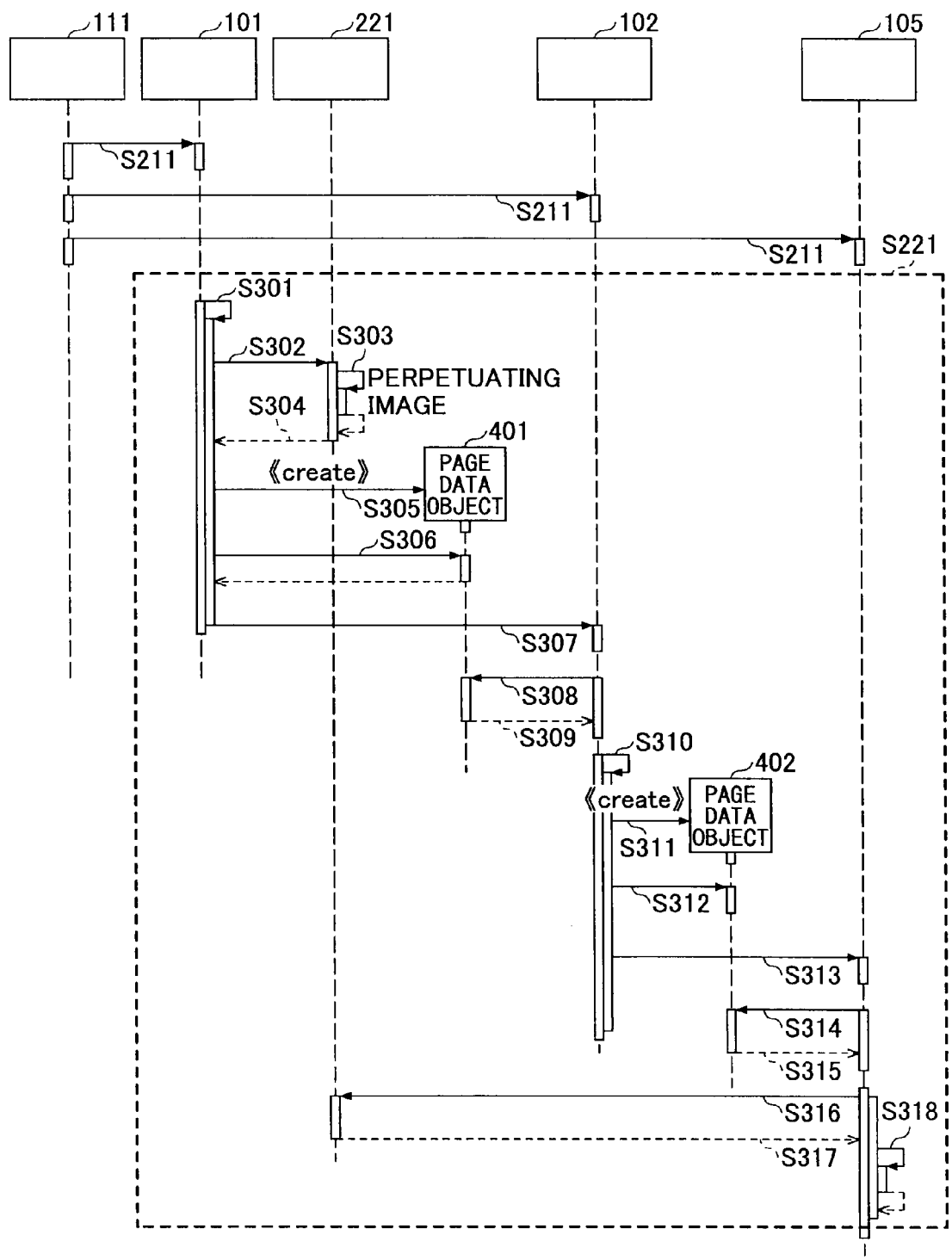
FIG. 12 is a sequence diagram explaining processes by filters in a scan job.

Next, a detailed description of step S221 will be given. FIG. 12 is a sequence diagram explaining a process by various filters used in processing the scan job.

In FIG. 12, numerical reference 111 designates a documents storage activity; 101 does a read filter; 221 does an image processing unit; 102 does an edit filter; 105 does a secure documents registration filter; S211 does a flow of job start; S301 does a readout process; S302 does a flow of making readout data; S303 does perpetuation of an image; S304 does a flow of a perpetuated ID; 401 does a flow of page data; S306 does a flow of a data setup (a flow of image information); S307 does a flow of writing data (a flow of page data); S308 does a flow of data acquisition; S309 does a flow of image data; S310 does an edit process; S311 does generation; 402 does a flow of page data; S312 does a flow of data setup (a flow of image information); S313 does a flow of writing data (a flow of page data); S314 does a flow of data acquisition; S315 does a flow of a perpetuated ID; S316 does a flow of acquiring an image identifier; S317 does a flow of an image identifier; and S318 does a flow of associating an image identifier with page information.

In step S211 of FIG. 12, the documents storage activity 111 notifies the filters, e.g. the read filter 101, the edit filter 102, and the secure documents readout filter 105, of starting of the scan job. This step corresponds to step S211 in FIG. 10.

A detailed process of step S221 in FIG. 10 will now be described. In response to the start notification of the scan job, the read filter 101 controls the imaging unit 604 to thereby read a page of the original (S301). Conditions of reading (resolution or the like) follow the attribute information set up in the read filter 101. Subsequently, the read filter 101 inputs the information thus read into the image processing unit 221 (S302). The image processing unit 221 converts the inputted information into image data having a predetermined format, for example JPEG, and temporarily saves the image data in the HDD 633 to perpetuate the image data (S303). Then the image processing unit 221 returns an ID for the image data (hereinafter referred to as "perpetuated ID") to the read filter 101 (S304). Here, the perpetuated ID is information for identifying the image data by the image processing unit 221 and is different from the image identifier in the page information.

Next, the read filter 101 creates a page data object 401 (S305). The page data object 401 is an object in which the page information is saved. Subsequently, the read filter 101 issues the perpetuated ID, the resolution, the paper size, the data size of the image data, and so on to the page data object 401 and sets these in the page data object 401 (S306). Subsequently, the read filter 101 inputs the page data object 401 into the edit filter 102 waiting for such input (S307).

The edit filter 102 acquires the image data through the page data object 401 in response to the input of the page data object 401 (S308, S309). Here, the expression of "acquires the image data through the page data object" means "acquiring the image data from the image processing unit 221 based on the perpetuated ID which has been set up in the page data object". Subsequently, the edit filter carries out an edit process in accordance with the attribute information set up for the device itself in step S310. Then the edit filter 102 creates a page data object 402 (S311) and further sets up the information set up in the page data object 401, some information newly created by the edit process and so on into the page data object 402 (S312). The edit filter 102 sets up the information (e.g. the data size), which is set up in the page data object 401 and updated by the edit process, so that the information has a value after the update. Subsequently, the edit filter 102 inputs the page data object 402 to the secure documents registration filter 105 waiting for such input (S313).

The secure documents registration filter 105 acquires the perpetuated ID from the page data object 402 in response to the input of the page data object 402 (S314, S315). Subsequently, the secure documents registration filter 105 acquires the image identifier (the path name) of the image data corresponding to the perpetuated ID from the image processing unit 221 (S316, S317). Subsequently, the secure documents registration filter 105 makes the image data be associated with the image identifier by registering the image identifier into the page data object 402 (S318).

The page information used from step S222 and onward is information saved in the page data object 402.

Figure 13:
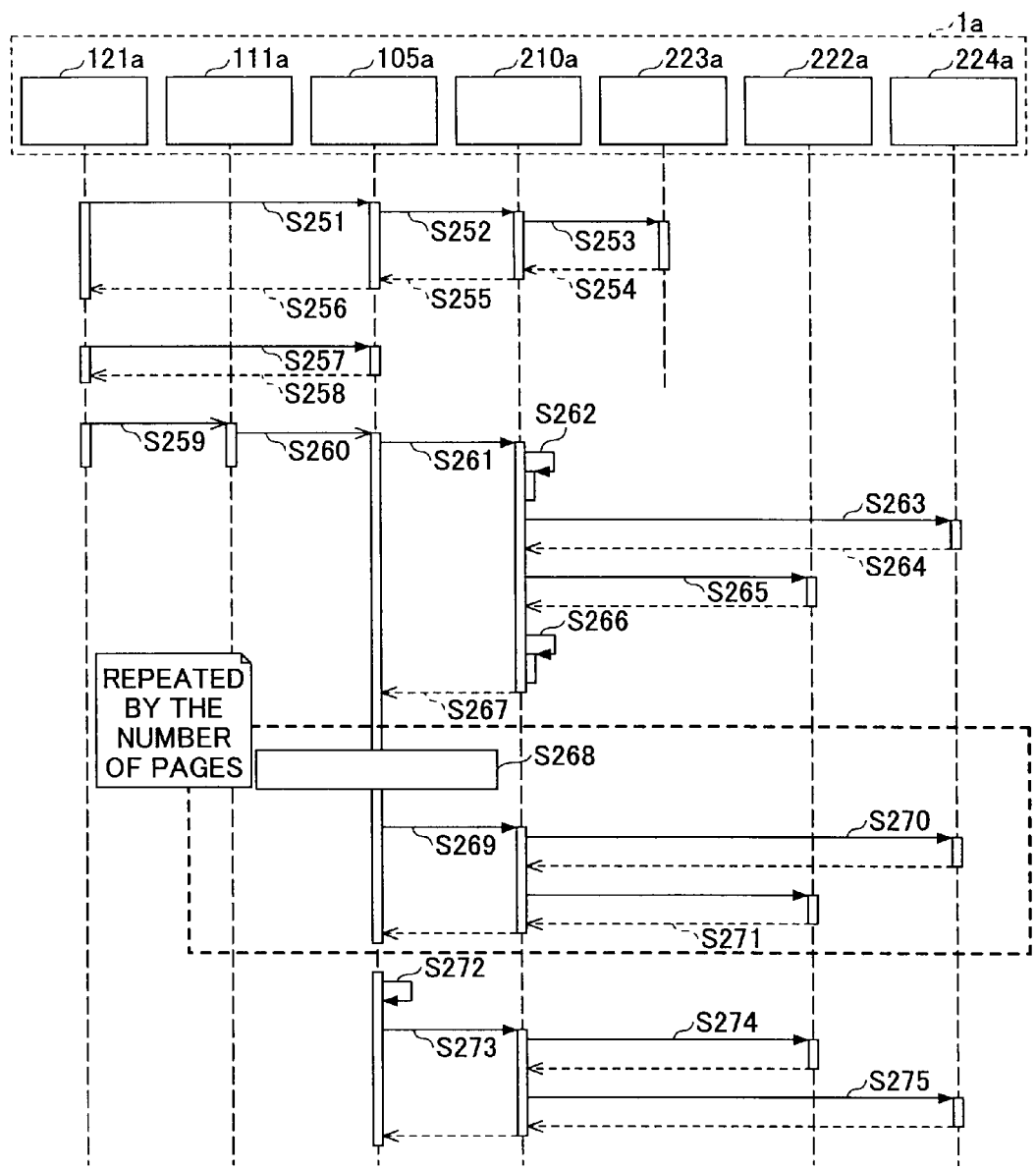
FIG. 13 is a sequence diagram explaining a process of saving documents data into a file server.

Next, a case where the file server 2 is selected as a save destination will be explained. FIG. 13 is a sequence diagram for explaining a process of storing documents data in the file server. The following describes an example in which the documents data related to the image data scanned by the multifunction machine 1*a* are saved in the file server 2*b*. In steps S251 to S258, a screen 520 for designating a save destination 520 is displayed on the operation panel 602 in a manner similar to steps S201 to S209 shown in FIG. 10 thereby enabling a user to designate a save destination. However, in step S257, a registered name, "here file server B", corresponding to the file server 2*b* is chosen as the save destination.

In FIG. 13, a numerical reference 121*a* designates an UI unit; 111*a* does a documents storage activity; 105*a* does a secure documents registration filter; 210*a* does a secure documents sharing service; 223*a* does a setup information control unit; 222*a* does a data control unit; 224*a* does a communication client; S251 and S252 do a flow iof acquiring a device list; S253 does a flow of acquiring setup information; S254 does a flow of setup information; S255 and S256 do a flow of a registered name list; S257 does a flow of selecting save destination; S259 and S261 do a flow of job start; S261 does a flow of checking whether documents can be saved; S262 does a flow of determining a type of a use device; S263 does a flow of acquiring a database file; S264 does a flow of database file; S265 does a flow of registering a database file; S266 does a flow of checking whether the device can be used; S267 does a flow of a result of the determination; S268 does readout of image data and so on; S269 does a flow of perpetuating page information; S270 does a flow of image data; S271 does a flow of perpetuating page information; S271 does a flow of making documents information; S273 and S274 do a flow of perpetuating documents information; and S275 does a flow of transferring database file.

Next when the user selects the start button on the operation panel 602, the UI unit 121*a* requests the documents storage activity 111*a* to start the scan job (S259). In response to the start request of the scan job, the documents storage activity 111*a* notifies various filters (the read filter 101*a*, the edit filter 102*a*, and the secure documents registration filter 105*a*) of the start of the job. In FIG. 13, only notification of starting the job (S260) to the secure documents registration filter 105*a* is shown for reasons of expediency.

Upon receipt of the notification of the start of the job, the secure documents registration filter 105*a* requests the secure documents sharing service 210*a* to check whether the documents data can be saved into the device (the use device), having the registered name, in use of the registered name thus chosen in step S257 as the parameter (S261). The secure documents registration filter 105*a* searches information of the device setup information corresponding to the registered name, designated as a parameter, and determines the device type (i.e. "HDD", "multifunction machine", or "file server") of the use device on the basis of the device setup information thus searched (S262). Since the registered name is chosen as "file server B", the device type is determined to be "file server".

Then the secure documents sharing service 210*a* requests a communication client 224*a* to acquire a database file from the file server 2*b* using an IP address, a path name, a login name, and a password, which are included in device setup information, as parameters (S263). The communication client 224*a* communicates with the file server 2*b* in use of the IP address, the path name, the login name, the password, and so on, which are included in the device setup information designated as the parameter, and acquires the database file saved inside the folder related to the path name (hereinafter, referred to as "documents data management folder") from the file server 2*b*. Subsequently, the communication client 224*a* returns the database file thus acquired to the secure documents sharing service 210*a* (S264).

Next, the secure documents sharing service 210*a* registers the database file thus acquired into a data control unit 222*a* (S265). The data control unit 222*a* saves the database file thus registered temporarily in the HDD 633 of the multifunction machine 1*a* and recognizes it as the database file subject to operation. Only data control units 222*a* of the multifunction machines 1 know a type of database file in this embodiment. Accordingly, each of the file servers 2 cannot register the documents information and the page information by operating the database file. Therefore, when the save destination is the file server 2, the database file is acquired as a whole and delegates an operation of the database file to the data control unit 222*a* that can operate (decode) the database file. In this, the data control unit 222*a* ordinarily operates the database file inside the device itself. However, when another database file is registered, the another database file is subject to operation.

Next, the secure documents sharing service 210*a* determines whether the use device can be used (S266). For example, this is determined based on whether the database file can be acquired, and/or whether the database file is registered in the data control unit 222*a*. The secure documents sharing service 210*a* returns a result of the determination to the secure documents registration filter 105*a* (S267). In a case where it is shown in the result of the determination that the use device can be used, the secure documents registration filter 105*a* waits for input from the edit filter 102.

In FIG. 13, the image data of one page are read by the read filter 101, and edit of the image data by the edit filter 102 and association of the image data with the page information by the secure documents registration filter 105 are omitted and represented by step S268. A process in step S268 is as described in FIG. 12.

After step S268, the secure documents registration filter 105*a* requests the secure documents sharing service 210*a* to perpetuate the page information for the image data thus read (S269). The secure documents sharing service 210*a* acquires the image data from the HDD 633 of the multifunction machine 1*a* based on the image identifier included in the page information and requests the communication client 224*a* to send the image data thus acquired (S270). The communication client 224*a* sends the image data to the documents data management folder of the file server 2*b*.

Next, the secure documents sharing service 210a requests the data control unit 222a to perpetuate the page information of the image data thus read (S271). Here, in a case where the image identifier is used as the path name of the image data file, the secure documents sharing service 210a rewrites the image identifier inside the page information to be a path name corresponding to the memory location (documents data management folder), which is saved by the file server 2b in step S270. Subsequently, the data control unit 222a updates the database file subject to the operation by registering the page information into the database file (i.e. the database file acquired by the file server 2).

Steps S268 to S271 (e.g. scanning, perpetuating the image data, perpetuating the page information) are carried out by the number of pages that are subject to the scan. After the perpetuation of the image data, that of the page information, and so on are completed, the secure documents registration filter 105a creates the documents information corresponding to the original (paper document) that has been scanned (S272). The page information ID of each the page information pieces that have been perpetuated is registered in the documents information.

Subsequently, the secure documents registration filter 105a requests the secure documents sharing service 210a to perpetuate the documents information thus created (S273). The secure documents sharing service 210b requests the data control unit 222a to perpetuate the documents information (S274). Subsequently, the data control unit 222a updates the database file subject to the operation by registering the documents information into the database file (i.e. the database file acquired by the file server 2).

Subsequently, the secure documents sharing service 210a requests the communication client 224a to transfer the database file thus updated (S275). The communication client 224a sends this database file to the documents data management folder of the file server 2b. By this, new documents data become registered into the file server 2b.

The secure documents sharing service 210a requests the data control unit 222a to delete (cancel the registration of) the database file after the database file is normally transferred. The data control unit 222a deletes the database file from the HDD 633 of the multifunction machine 1a and releases the database file from the subject of the operation. As a result, the database file of the multifunction machine 1a restitutes as the subject of the operation by the data control unit 222a.

Figure 14:
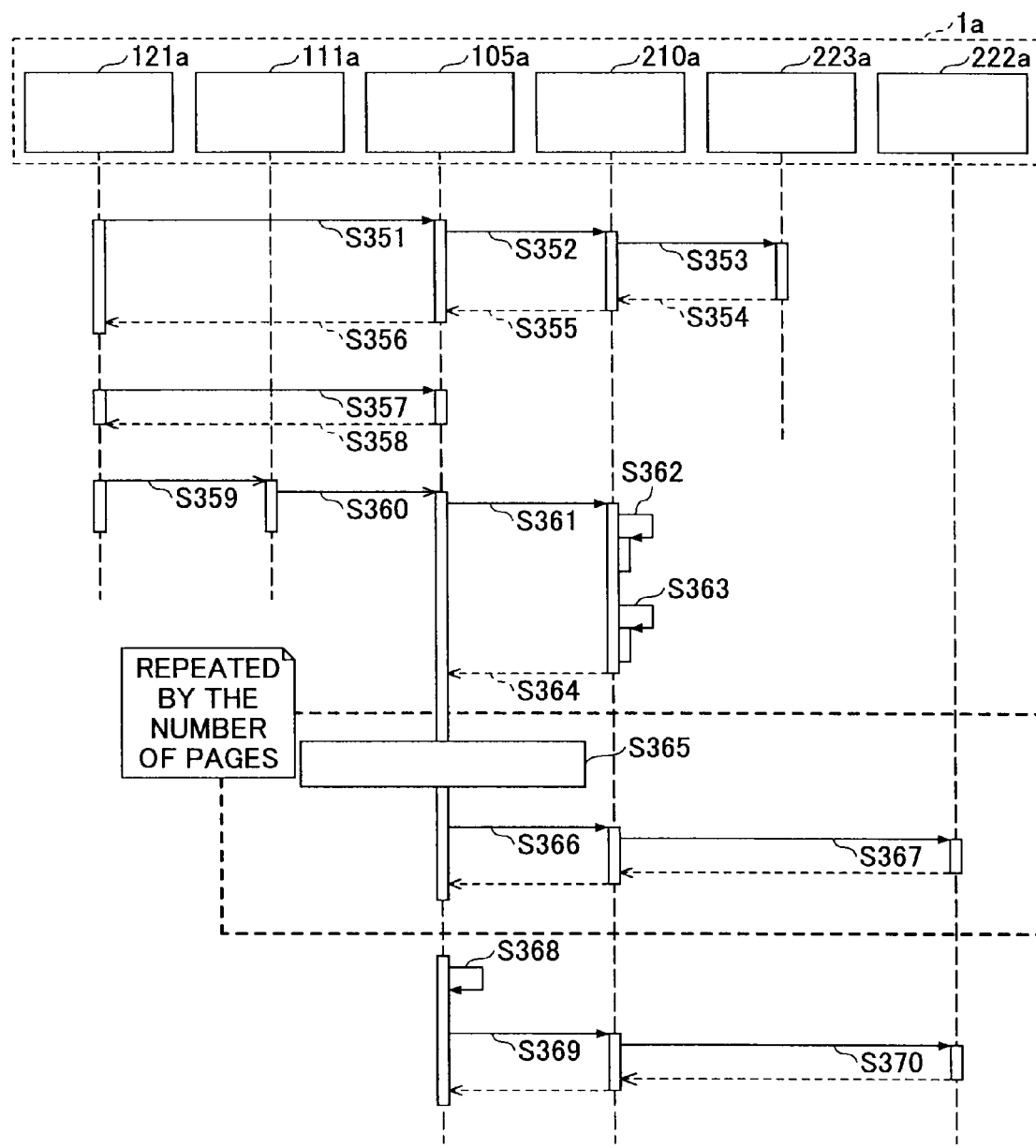
FIG. 14 is a sequence diagram explaining a process of saving documents data into a device itself.

Next, a case where the own multifunction machine is chosen as a save destination will be explained. FIG. 14 is a sequence diagram for explaining a process of storing documents data into the multifunction machine 1a.

In FIG. 14, numerical reference 121a designates a UI unit; 111a does a documents storage activity; 105a does a secure documents registration filter; 210a does a secure documents sharing service; 223a does a setup information control unit; 222a does a data control unit; S351 and S352 do acquisition of a device list; S353 does acquisition of setup information; S354 does a flow of setup information; S355 and S356 do a flow of a registration name list; S357 does a flow of selecting a save destination; S359 and S360 does a flow of job start; S361 does a flow of checking whether documents can be saved; S362 does a flow of determining a type of a use device; S363 does a flow of checking whether the device can be used; S364 does a flow of a result of the determination; S365 does a readout of image data and so on; S366 and S367 do a flow of perpetuating page information; S368 does a flow of making documents information; and S369 and S370 do a flow of perpetuating documents information.

Referring to FIG. 14, the following is an example that the documents data concerning the image data scanned by the multifunction machine 1a are saved in the device itself (the multifunction machine 1a). In steps S351 to S358, a screen for designating a save destination 520 is displayed on an operation panel 602 in a manner similar to steps S201 to S209 in FIG. 10 thereby enabling a user to designate the save destination. However, in step S357, a registered name (HDD) corresponding to the multifunction machine 1a is chosen as the save destination.

Next, when the user selects the start button on the operation panel 602, the UI unit 121a requests the documents storage activity 111a to start a scan job (S359). In response to a start request of the scan job, the documents storage activity 111a notifies the filters (the read filter 101a, the edit filter 102a, and the secure documents registration filter 105a) of the start of job. In FIG. 14, only notification (S360) to the secure documents registration filter 105a is shown for reasons of expediency.

Upon receipt of the notification of the start of job, the secure documents registration filter 105a requests the secure documents sharing service 210a to check whether documents data can be saved into a device (a use device), having a registered name, in use of the registered name thus chosen in step S357 as a parameter (S361). The secure documents registration filter 105a searches information of device setup information corresponding to the registered name, designated as a parameter, and determines a device type (i.e. "HDD", "multifunction machine", or "file server") of the use device on the basis of the device setup information thus searched (S362). Since the registered name is chosen as "HDD", the device type is determined to be "HDD" (the device itself). Therefore, the secure documents sharing service 210a determines whether the data control unit 222a of the own multifunction machine can be used (S363). For example, it is determined whether the data control unit 222a normally operates inside the multifunction machine 1a itself. The secure documents sharing service 210a returns the result of the determination to the secure documents registration filter 105a (S364). In a case where the result of the determination shows the use device can be used, the secure documents registration filter 105a waits for an input from the edit filter 102.

In FIG. 14, a page of image data of is read by the read filter 101, and edit of the image data by the edit filter 102 and association of the image data with page information by the secure documents registration filter 105 are not specifically shown and represented by step S365. A process in step S365 is as described in FIG. 12.

After step S365, the secure documents registration filter 105a requests the secure documents sharing service 210a to perpetuate the page information for the image data thus read (S366). The secure documents sharing service 210a requests the data control unit 222a to perpetuate the page information (S367). The data control unit 222a updates the database file subject to operation by registering the page information into the database file. Here, because another database file is not registered in the data control unit 222a, the database file of the own multifunction machine 1a is subject to the operation.

Steps S365 to S367 (e.g. scanning, perpetuating the image data, and perpetuating the page information) are carried out by the number of pages subject to the scan. After the perpetuation of the image data, that of the page information, and so on are completed, the secure documents registration filter 105a creates the documents information corresponding to the original (a paper document) that has been scanned (S368). A page information ID of each the page information that has been perpetuated is registered in the documents information.

Subsequently, the secure documents registration filter 105a requests the secure documents sharing service 210a to perpetuate the documents information thus created (S369). The secure documents sharing service 210b requests the data control unit 222a to perpetuate the documents information (S370). Subsequently, the data control unit 222a updates the database file subject to the operation by registering the documents information into the database file (i.e. the database file of the multifunction machine 1a). By this, new documents data become registered into the multifunction machine 1a.

Next, a process of taking out the documents data will be described, an example that the documents data are taken out in an accumulated documents printing job will be described. The accumulated documents printing job is a job in the multifunction machine 1 of printing the documents data accumulated (saved) in the multifunction machine 1 or the file server 2. However, the process of taking out the documents data can be utilized in common with various jobs other than the accumulated documents printing job. The accumulated documents printing job is controlled by a copy activity 112.

Figure 15:
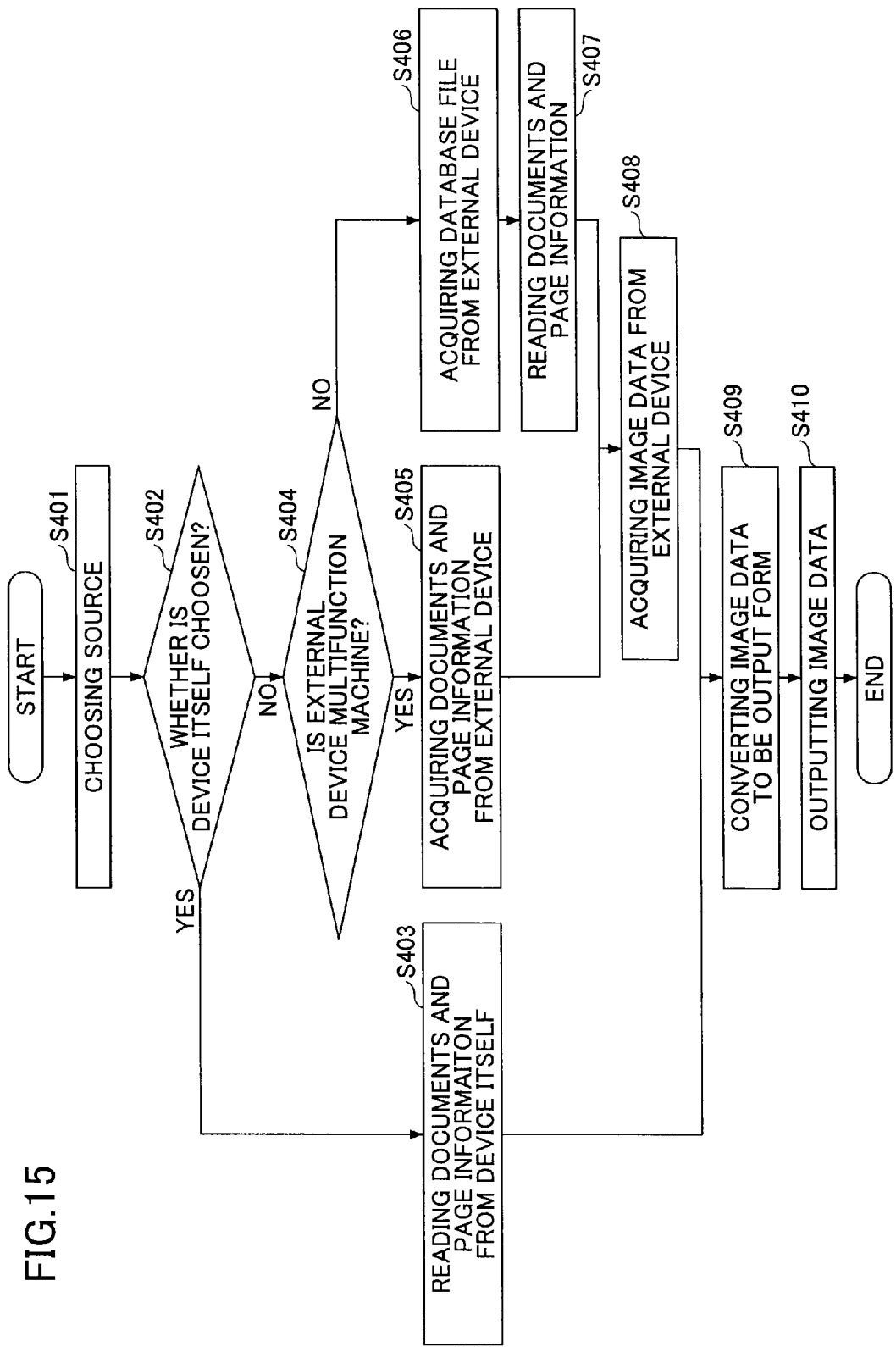
FIG. 15 is a flow diagram for explaining an outline of a taking-out process of the documents data.

FIG. 15 is a flow diagram for explaining an outline of taking-out process of the documents data.

First, a registered name of device, which is a source of documents data, is chosen from the device setup information control table 2231 in the multifunction machine 1 (the multifunction machine 1a) subject to operation (S401). Subsequently, the multifunction machine 1a determines whether a use device is the device itself base on the device type associated with the registered name thus chosen in the device setup information. When the device type is "HDD", the multifunction machine 1a determines that the device itself is the use device (YES of S402), and acquires documents information and page information from the control unit 222 of the device itself (S403). Subsequently, the multifunction machine 1a acquires the image data based on the image identifier of the page information thus acquired and converts it to an output format (S409). Subsequently, the multifunction machine 1a outputs (prints) the image data thus converted (S410).

On the other hand, when the device type associated with the registered name thus selected is not "HDD", the multifunction machine 1a determines the use device is not the device itself (NO of S402), and further determines whether the use device is another multifunction machine 1 (S404). When the device type is "multifunction machine", the multifunction machine 1a determines that the another multifunction machine 1 is the use device and acquires documents information and page information from the another multifunction machine 1 based on device setup information of the another multifunction machine 1 (S405). When the use device is the another multifunction machine 1, steps S405 and S408 are processed by the secure documents web service client 211a of the multifunction machine 1a of remotely calling methods (e.g. a documents information acquisition method, a page information acquisition method, or an image data acquisition method), provided by the secure documents web service server 212 of the another multifunction machine 1.

In a case where the device type associated with the registered name thus chosen is not "multifunction machine" and is "file server", the multifunction machine 1a determines that the file server 2 is the use device and acquires a database file from the file server 2 based on the device setup information of the file server 2 (S406). Subsequently, the multifunction machine 1a extracts documents information and page information from the database file thus acquired (S407). Subsequently, the multifunction machine 1a acquires image data from the file server 2 based on an image identifier included in the page information thus extracted (S408), and the image data are printed out (S411). When the use device is the file server 2, steps S406 and S408 are processed based on a communication protocol such as a FTP and an SMB usable by the file server 2.

Figure 16:
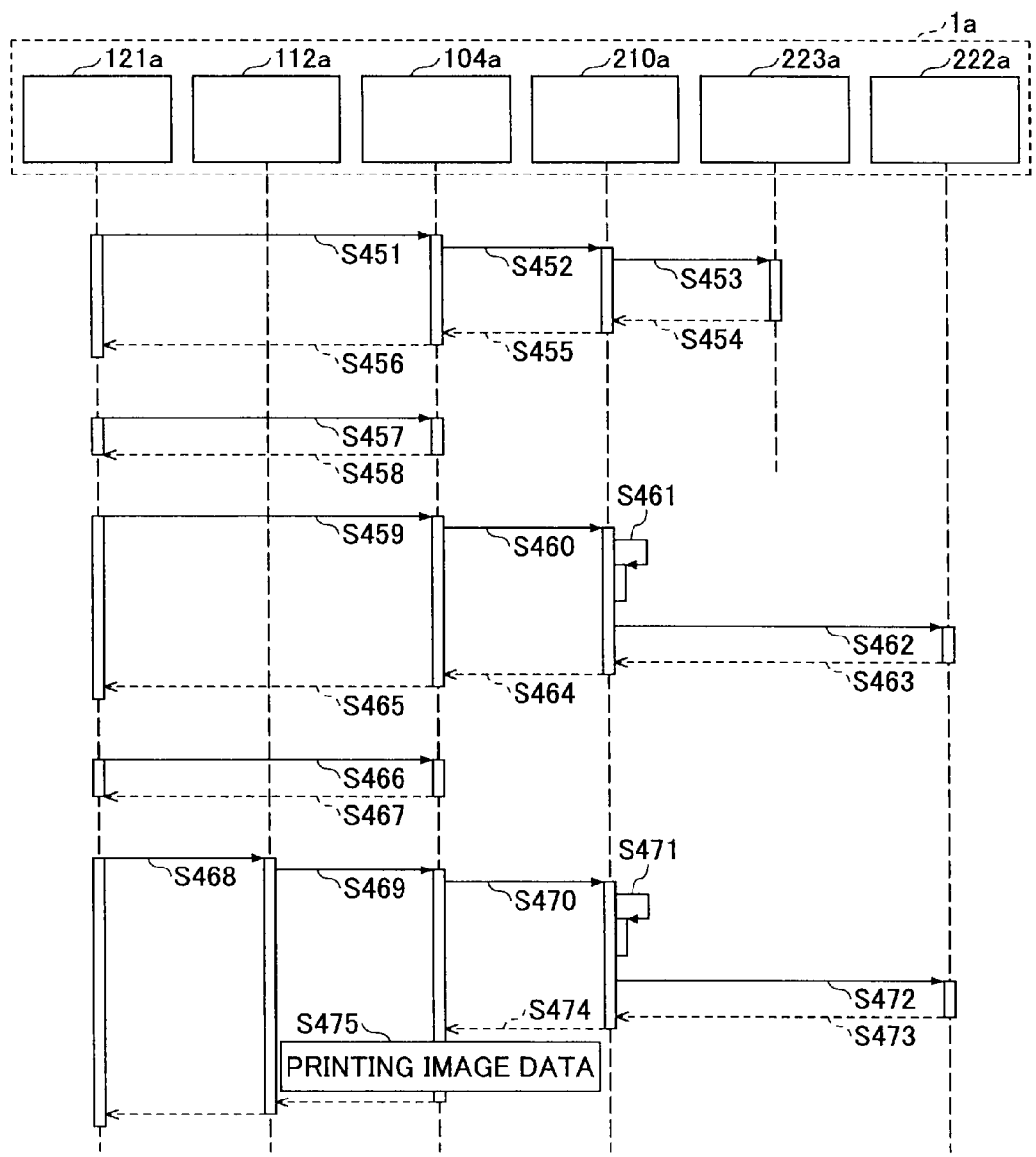
FIG. 16 is a sequence diagram explaining a process of storing documents data into the device itself.

FIG. 16 is a sequence diagram for explaining a process of acquiring documents data from the device itself. Referring to FIG. 16, the documents data saved in the device itself (multifunction machine 1a) are taken out, and the image data included in the documents data are printed out by the multifunction machine 1a.

In FIG. 16, numerical reference 121 designates a UI unit; 112a does a copy activity; 104a does a secure documents readout filter; 210a does a secure documents sharing service; 223a does a setup information control unit; 222a does a data control unit; S451 and S452 do a flow of acquiring a device list; S453 does a flow of acquiring setup information; S454 does a flow of setup information; S455 and S456 do a flow of a registered name list; S457 do a flow of choosing a source; S459 and S460 does a flow of acquiring a document list; S461 does determination of a type of a use device; S462 does a flow of searching a document list; S463 to S465 do a flow of a documents list; S466 does a flow of selecting a document; S468 and S469 do a flow of job start; S470 does a flow of acquiring page information; S471 does determination of a type of a use device; S472 does a flow of acquiring page information; S473 and S474 does a flow of page information; and S475 does a print process of image data.

In the multifunction machine 1a, when the accumulated documents printing job is chosen as an object to be processed by a user through the operation panel 602, the UI unit 121a makes an operation screen (accumulated documents printing screen) of the copy activity 112a display on the operation panel 602. The attribute information (execution condition) with respect to a secure documents readout filter 104a, the edit filter 102, and the print filter 103a, which are used in the accumulated documents printing job, can be set up through the accumulated documents printing screen.

The attribute information of one or more of the filters is associated with screen transition for setting up a value. One example of the screen transition is selections of a source and a document to be acquired. For example, when a button for the save destination is selected on the accumulated documents printing screen, the UI unit 121a requests the secure documents readout filter 104a to send a list of devices usable as the source (S451). The secure documents readout filter 104a requests the secure documents sharing service 210a to send the list (S452). The secure documents sharing service 210a requests the setup information control unit 223a to acquire device setup information, in response to the request (S453). The setup information control unit 223a acquires device setup information from the device setup information control table 2231 and returns it to the secure documents sharing service 210a (S454). The secure documents sharing service 210a saves the device information thus returned in a memory and returns a list of registered names, which are registered in the device setup information, to the secure documents readout filter 104a (S455). The secure documents readout filter 104a returns the list of the registered names to the UI unit 121a (S456).

Subsequently, the UI unit 121a sets up the registered name ("HDD") corresponding to the device itself in the list of the registered names (S457 and S458). The device itself is the source by default.

Subsequently, the UI unit 121a requests the secure documents readout filter 104a to acquire a list of the documents data (a document list) (S459). In response to the requests, the secure documents readout filter 104a requests the secure documents sharing service 210a to acquire the documents list using the registered name set up as the source. The secure documents sharing service 210a determines the device type of the use device based on the registered name and the device setup information control table 2231 (S461). Here, the registered name is "HDD". The device type corresponding to the registered name in the device setup information control table 2231 is "HDD". Accordingly, the secure documents sharing service 210a determines that the device itself is the use device.

Then the secure documents sharing service 210a requests the data control unit 222a of the device itself to search the documents list (S462). The data control unit 222a extracts (searches) the list of the documents information from the database file of the device itself, which is subject to operation and returns the information thus extracted as a documents list (S463). The documents list is returned to the UI unit 121a through the secure documents readout filter 104a (S464 and S465).

Then the UI unit 121a generates a documents selection screen using the list of the registered names and the documents list and makes the documents selection screen display on the operation panel.

Figure 17:
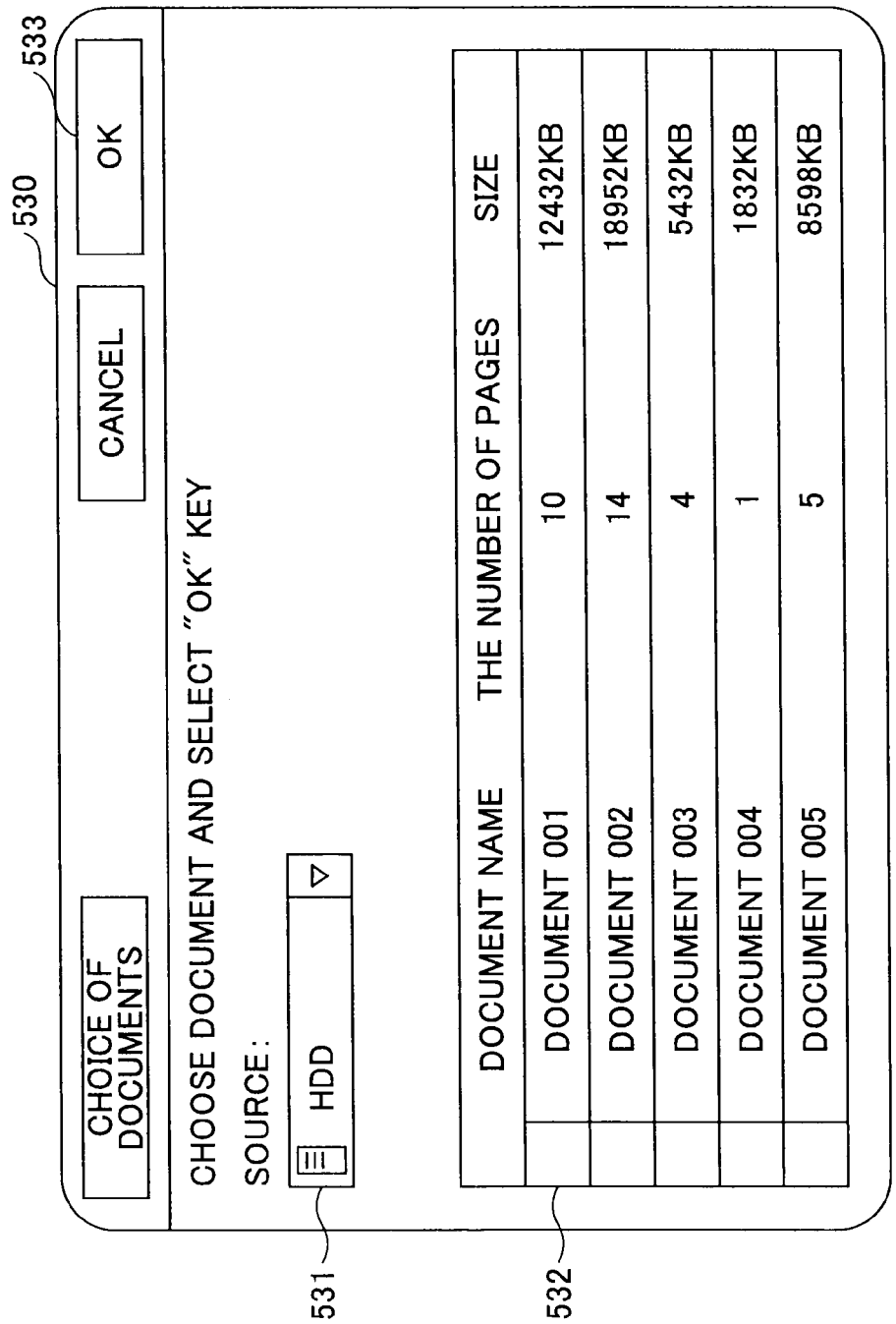
FIG. 17 is an example of displaying an initial state of a documents selection screen.

FIG. 17 is an example of displaying an initial state of the documents selection screen. Referring to FIG. 17, a documents selection screen 530 is provided for choosing the documents data subject to print and has a list box 531, a documents list display area 532 and so on. The list box 531 makes a list of registered names display as candidates of the source. Further, a list of the documents saved in the device, which is chosen in the list box 531, is displayed in the documents list display area 532. In an initial state, a registered name of the source is set up to be "HDD". Accordingly, "HDD" is initially chosen in the list box 531, and the documents list searched by the device itself are displayed in the documents list display area 532.

When one or more of the documents data are chosen from the documents list display area 532 and an OK button 533 is selected, the UI unit 121a sets up a documents name of the documents data thus chosen into the secure documents readout filter 104a (S466 and S467).

When the setup of the attribute information to the filters ends and the start button on the operation panel 602 is selected by a user, the UI unit 121a requests the copy activity 112a to start the accumulated documents printing job (S468). In response to a start request of the accumulated documents printing job, the copy activity 112a notifies the filters (the secure documents readout filter 104a, the edit filter 102a, and the print filter 103a) to start a job. In FIG. 16, only notification (S469) to the secure documents readout filter 104a is shown for reasons of expediency.

The secure documents readout filter 104a is at an end of a connection of the filters in doing the accumulated documents print job. Accordingly, the secure documents readout filter 104a starts a process of taking out the documents data in response to the start notification of the job. First, the secure documents readout filter 104a requests the secure documents sharing service 210 to acquire the page information using the registered name of the use device, set up in step S458, and the documents name, set up in step S466, as parameters (S470).

The secure documents sharing service 210a determines that the device type of the use device is "HDD" (the device itself), based on the registered name designated as the parameter and the device setup information control table 2231 (S471). Then the secure documents sharing service 210a requests the data control unit 222a of the device itself to acquire page information as a parameter (S472). The data control unit 222a extracts (searches) the page information included in the documents information related to the documents name as the parameter from the database of the device itself and returns the page information to the secure documents sharing service 210a (S473). When a plurality of page information pieces are extracted, these are returned. The secure documents sharing service 210a returns the page information to the secure documents readout filter 104a (S474).

Subsequently, the image data associated respectively with the page information pieces by the secure documents readout filter 104a, the edit filter 102a, and the print filter 103a are printed (S475). After the print is completed, the accumulated documents print job ends.

Figure 18:
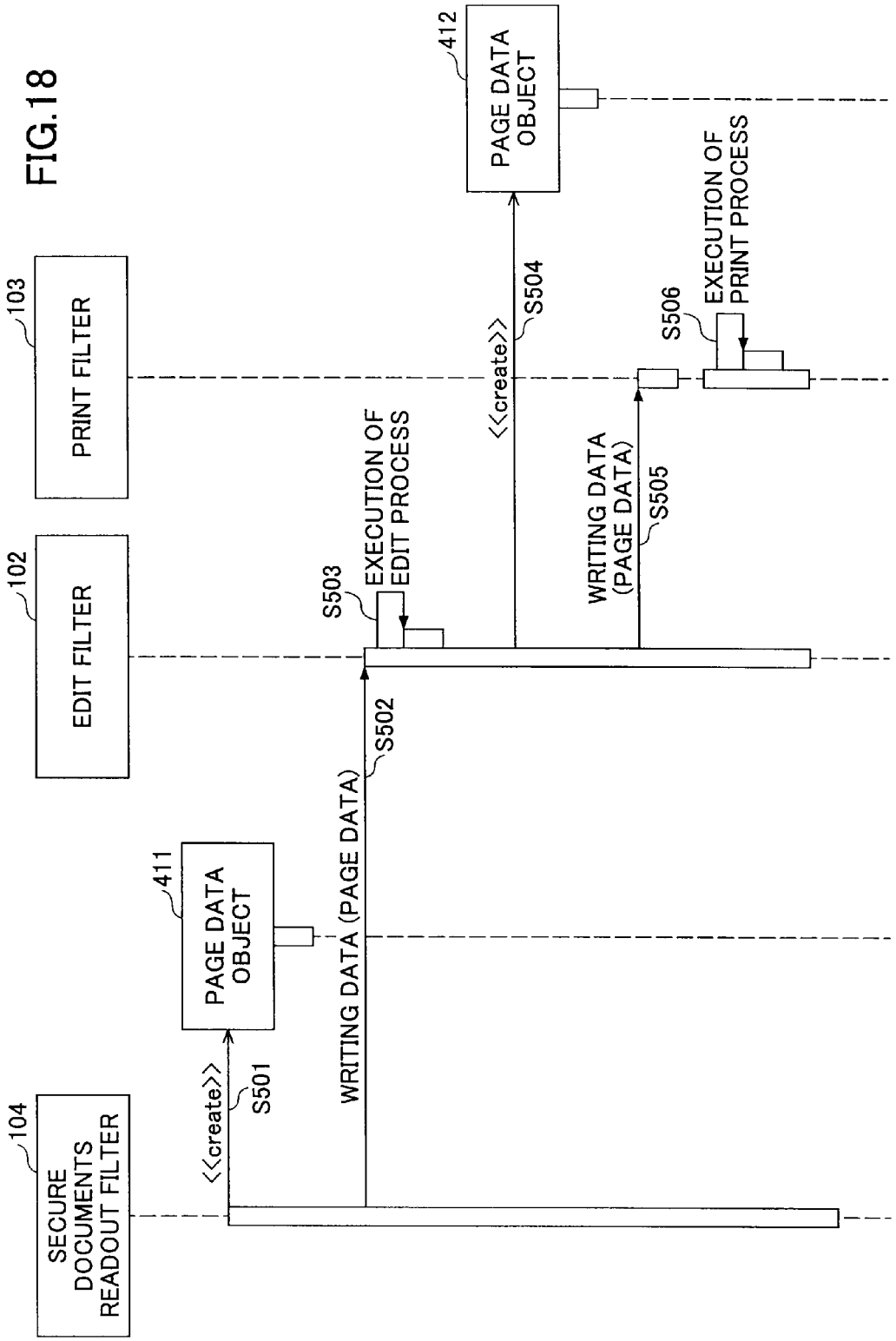
FIG. 18 is a sequence diagram explaining a print process of image data.

Next, a detailed description of step S475 will be given. FIG. 18 is a sequence diagram for explaining a print process of image data. The processes in FIG. 18 are carried out with respect to each of the page information pieces returned in step S474.

In FIG. 18, numerical reference 104 designates a secure documents readout filter; 102 does an edit filter; 103 does a print filter; 411 and 412 do a page data object; S501 does a flow of making the page data object; S502 does a flow of writing data (page data); S503 does execution of an edit process; S504 does a flow of making the page data; S505 does a flow of writing data (page data); and S506 does execution of a print process.

The secure documents readout filter 104 creates a page data object 411 and sets up the page information into the page data object 411 (S501). Subsequently, the secure documents readout filter 104 inputs the page data object 411 to the edit filter 102 waiting for an input (S502).

The edit filter 102 acquires image data through the page data object 411 in response to an input of the page data object 411 and provides an edit process to the image data in response to attribute information set up for the device itself. Subsequently, the edit filter 102 creates a page data object 412 and further sets up information set up in the page data object 411, information newly created by the edit process and so on into a page data object 412 (S504).

The edit filter 102 sets up information (e.g. a data size), which is set up in the page data object 411 and updated by the edit process, so that the information has a value of after the update. Subsequently, the edit filter 102 inputs the page data object 412 to the print filter 103 waiting for the input (S505).

In response to the input of the page data object 412, the print filter 103 acquires the image data through the page data object 412 and prints the image data by controlling a print unit 605 (S506).

Figure 19:
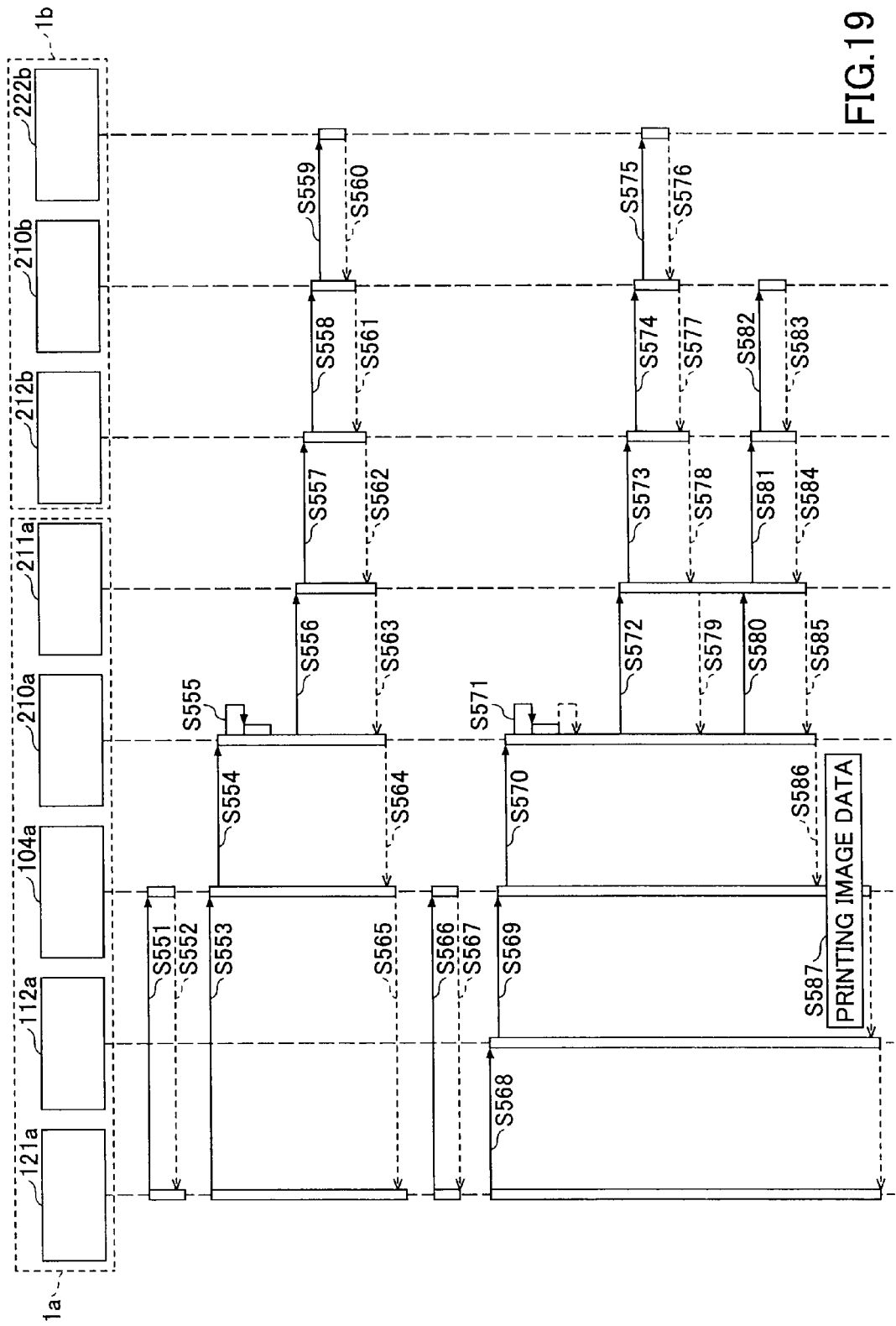
FIG. 19 is a sequence diagram explaining a process of saving documents data into another multifunction machine.

Next, a case where the multifunction machine 1 is chosen as the source will be explained. FIG. 19 is a sequence diagram for explaining a process of acquiring documents data from another copy machine. The documents data saved in the multifunction machine 1b are taken out to the multifunction machine 1a, and the image data included in the documents data are printed by the multifunction machine 1a. Referring to FIG. 19, numerical references for the constitutional elements included in the multifunction machine 1a have a suffix of "a", and those included in the multifunction machine 1b have a suffix of "b".

In FIG. 19, numerical reference 121a designates a UI unit of the multifunction machine 1a; 112a does a copy activity of the multifunction machine 1a; 104a does a secure documents readout filter of the multifunction machine 1a; 210a does a secure documents sharing service of the multifunction machine 1a; 211a does a secure documents web service client of the multifunction machine 1a; 212b does a secure documents web service client of the multifunction machine 1b;

210b does a secure documents sharing service of the multifunction machine 1b; 222b does a data control unit of the multifunction machine 1b; S551 does a flow of choosing a source; S553 and S554 do a flow of acquiring a document list; S555 does determination of a type of a use device; S556 to S559 do a flow of acquiring a documents list; S560 to S565 do a flow of a documents list; S566 does a flow of choosing a document; S568 to S570 do a flow of job start; S570 does a flow of acquiring page information; S571 does determination of a type of a use device; S572 to S575 do a flow of acquiring page information; S576 to S579 do a flow of page information; S580 to S582 do a flow of acquiring image data; S583 to S585 do a flow of image data; S586 does a flow of page information; and S587 does a printing process of image data.

Processes in FIG. 19 are carried out after the processes of steps S451 to S465 in FIG. 16 are completed and the initial state of the documents selection screen 530 is displayed in the operation panel 603. When the registered name (the multifunction machine B) of the multifunction machine 1b is chosen from the list box 531 and then the OK button 533 is selected by a user, the UI unit 121 sets up the registered name thus chosen into the secure documents readout filter 104a as the registered name in the source (S551, S552).

Subsequently, the UI unit 121a requests the secure documents readout filter 104a to acquire the list of documents data (the document list) (S553). In response to the requests, the secure documents readout filter 104a requests the secure documents sharing service 210a to acquire the documents list using the registered name set up as the source as a parameter (S554). The secure documents sharing service 210a determines a device type of the use device on the basis of the registered name designated as the parameter and the device setup information control table 2231 (S555). Here, the registered name (the multifunction machine B) corresponding to the multifunction machine 1b is chosen. The device type corresponding to the registered name in the device setup information control table 2231 is "multifunction machine". Accordingly, the secure documents sharing service 210a determines that another multifunction machine 1 is the use device.

Then the secure documents sharing service 210a acquires a URL from the device setup information of the use device and requests the secure documents web service client 211a to acquire the documents list using the URL as a parameter (S556). The secure documents web service client 211a sends a simple object access protocol (SOAP), which indicates a request of acquiring the documents list to the URL, designated as a parameter, thereby remotely calling a documents list acquisition method of the secure documents web service server 212b (S557).

The secure documents web service server 212b requests the secure documents sharing service 210b to acquire the documents list in response to a call by the documents list acquisition method based on the SOAP request (S558). The secure documents sharing service 210b requests the data control unit 222b to search the documents list (S559). The data control unit 222b extracts (searches) a list of documents information from the database file of the multifunction machine 1b and returns the information thus extracted as the documents list to the secure documents sharing service 210b (S560). The secure documents sharing service 210b returns the documents list to the secure documents web service server 212b (S561). The secure documents service server 212b returns the SOAP response including the documents list to the secure documents web service client 211a of the multifunction machine 1a (S562).

The secure documents web service client 211a returns the documents list included in the SOAP response to the secure documents sharing service 210a after receiving the SOAP response (S563). The documents list is returned to the UI unit 121a through the secure documents readout filter 104a (S564 and S565).

Then the UI unit 121a generates a documents selection screen 530 using a list of registered names and the documents list and makes the documents selection screen 530 display on the operation panel 602.

Figure 20:
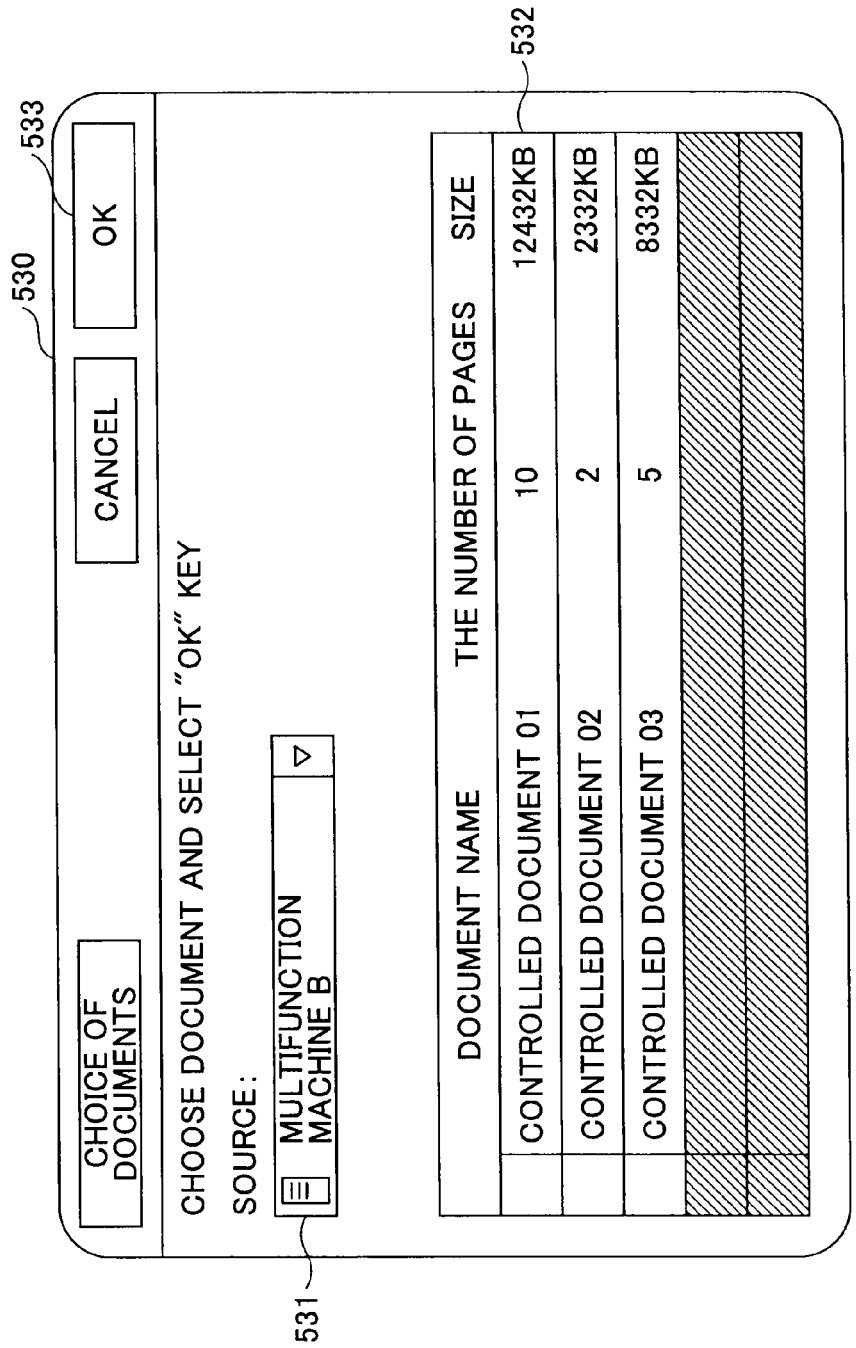
FIG. 20 shows an example of displaying a documents selection screen on which a source of the documents data is changed.

FIG. 20 shows an example of displaying a document selection screen on which the source of the document data can be changed. In the list box 531 of the documents selection screen 530 in FIG. 20, the source is changed to "multifunction machine B". Further, a list of the documents data saved in the multifunction machine 1b is displayed in the documents list display area 532.

When one or more of the documents data are chosen in the documents list display area 532 and an OK button 533 is selected, the UI unit 121a sets up a documents name of the documents data thus selected into the secure documents readout filter 104a (S566 and S567).

Referring back to FIG. 19, when the attribute information is completely set up into the filters and the start button on the operation panel 602 is selected by a user, the UI unit 121a requests the copy activity 112a to start an accumulated documents printing job (S568). In response to a start request of the accumulated documents printing job, the copy activity 112a notifies the filters (the secure documents readout filter 104a, the edit filter 102a, and the print filter 103a) to start a job. Only notification (S569) to the secure documents readout filter 104a is shown for reasons of expediency.

The secure documents readout filter 104a requests the secure documents sharing service 210a to acquire the page information using the registered name of the use device set up in step S551 and the documents name set up in step S566 as parameters, in response to the notification to start the job (S570). Subsequently, the secure documents sharing service 210a determines that a device type of the use device is "multifunction machine", based on the registered name designated as the parameter and the device setup information control table 2231 (S571).

Then the secure documents sharing service 210a acquires the URL from the device setup information of the use device and requests the secure documents web service client 211a to acquire page information using the URL and the documents name as parameters (S572). The secure documents web service client 211a sends a SOAP request, which indicates a request of acquiring the page information to the URL, designated as the parameter, thereby remotely calling a page information acquisition method of the secure documents web service server 212b (S573).

The secure documents web service server 212b requests the secure documents sharing service 210b to acquire the page information included in the documents information related to the documents name designated as the parameter in response to the call of the page information acquisition method based on the SOAP request (S574). The secure documents sharing service 210b requests the data control unit 222b to request a search of the page information included in the documents information (S575). The data control unit 222b extracts (searches) the page information from the database file of the multifunction machine 1b and returns the information thus extracted to the secure documents sharing service 210b (S576). The secure documents sharing service 210b returns the page information to the secure documents web service server 212b (S577). The secure documents service server 212b returns the SOAP response including the page information to the secure documents web service client 211a of the multifunction machine 1a (S578). The secure documents web service client 211a returns the page information included in the SOAP response to the secure documents sharing service 210a after receiving the SOAP response (S579). Subsequently, the secure documents sharing service 210a requests the secure documents web service client 211a to acquire the image data using the URL of the use device and the page information thus acquired as parameters (S580). The secure documents web service client 211a sends the SOAP request, which indicates a request of acquiring the image data to the URL, designated as the parameter, thereby remotely calling an image data acquisition method of the secure documents web service server 212b (S581).

The secure documents web service server 212b requests the secure documents sharing service 210b to acquire the image data related to an image identifier that is designated as the parameter in response to the call of the image data acquisition method based on the SOAP request (S582). The secure documents sharing service 210b acquires the image data from the HDD 633 of the multifunction machine 1b based on the image identifier and returns the image data thus acquired to the secure documents web service server 212 (S583). The secure documents service server 212b returns the SOAP response including the image data to the secure documents web service client 211a of the multifunction machine 1a (S584). The secure documents web service client 211a returns the image data included in the SOAP response to the secure documents sharing service 210a after receiving the SOAP response (S585). When a plurality of page information pieces are acquired, steps S580 to S585 are repeated by the number of page information pieces.

The secure documents sharing service 210a returns the image data thus acquired to the secure documents readout filter 104a (S586). Subsequently, the image data are printed as described in FIG. 18 (S587). Thus the accumulated documents print job ends.

Figure 21:
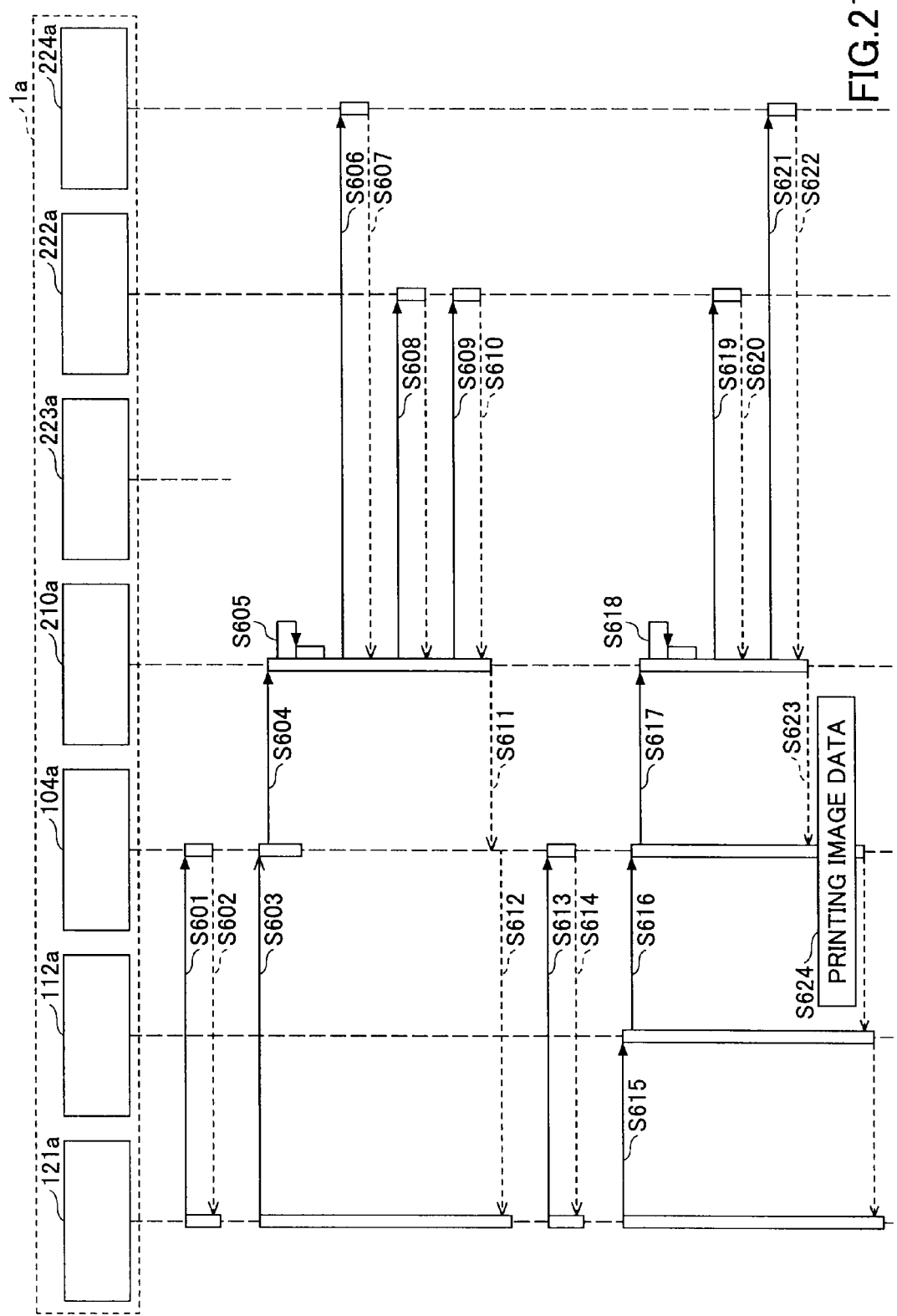
FIG. 21 is a sequence diagram explaining a process of acquiring documents data from a file server.

Next, a case where the file server 2 is selected as the source will be explained. FIG. 21 is a sequence diagram for explaining a process of acquiring documents data from the file server.

In FIG. 21, numerical reference 121a designates a UI unit; 112a does a copy activity; 104a does a secure documents readout filter; 210a does a secure documents sharing service; 223a does a setup information control unit; 222a does a data control unit; 224a does a communication client; S601 does a flow of choosing a source; S603 and S604 do a flow of acquiring a documents list; S605 does determination of a type of a use device; S606 does a flow of acquiring a database file; S607 does a flow of a database file; S608 does a flow of registering a database file; S609 does a flow of acquiring a documents list; S610 to S612 do a flow of a document list; S613 does a flow of choosing an output document; S615 to S617 do a flow of job start; S618 does determination of a type of a use device; S619 does a flow of acquiring page information; S620 does a flow of page information; S621 does a flow of acquiring image data; S622 does a flow of image data; S623 does a flow of page information; and S624 does a printing process of image data.

Referring to FIG. 21, the documents data saved in the file server 2b are taken out to the multifunction machine 1a, and the image data included in the documents data are printed by the multifunction machine 1a.

The processes in FIG. 21 are carried out after steps S451 to S465 in FIG. 16 are completed and the initial state of the documents selection screen 530 is displayed on the operation panel 603.

In this state, the registered name (file server B) corresponding to the file server 2b is chosen from the list box 531 and then the OK button 533 is selected by a user. Then the UI unit 121 sets up the registered name thus selected into the secure documents readout filter 104a as a registered name of source (S601, S602).

Subsequently, the UI unit 121a requests the secure documents readout filter 104a to acquire a documents list (S603). In response to the requests, the secure documents readout filter 104a requests the secure documents sharing service 210a to acquire the documents list using the registered name set up as the source (S604). The secure documents sharing service 210a determines a device type of the use device on the basis of the registered name designated as the parameter and the device setup information control table 2231 (S605). Here, the registered name (file server B) corresponding to the file server 2b is selected. The device type corresponding to the registered name in the device setup information control table 2231 is "file server". Accordingly, the secure documents sharing service 210a determines that the file server 2 is the use device.

Then the secure documents sharing service 210a requests the communication client 224a to acquire the database file from the file server 2b using an IP address, a path name, a login name, and a password, which are included in device setup information, as parameters (S606). The communication client 224a communicates with the file server 2b in use of the IP address, the path name, the login name, the password, and so on, which are included in the device setup information designated as the parameters, and acquires the database file saved inside the folder related to the path name (hereinafter, referred to as "documents data management folder") from the file server 2b. Subsequently, the communication client 224a returns the database file thus acquired to the secure documents sharing service 210a (S607).

Then the secure documents sharing service 210a registers the database file thus acquired to the data control unit 222a (S608). The data control unit 222a saves the database file thus registered temporarily in the HDD 633 of the multifunction machine 1a and recognizes it as the database file subject to operation. Then the secure documents sharing service 210a requests the data control unit 222a to search the documents list (S609). The data control unit 222a extracts (searches) the list of the documents information from the database file, which is subject to the operation, and returns the information thus extracted as a documents list to the secure documents sharing service 210a (S610). The documents list is returned to the UI unit 121a through the secure documents readout filter 104a (S611 and S612).

Subsequently, the UI unit 121a updates the documents list display area 532 of the documents selection screen 530 by the documents list thus returned. When one or more of the documents data are selected in the documents list display area 532 and an OK button 533 is selected, the UI unit 121a sets up a documents name of the documents data thus selected into the secure documents readout filter 104a (S613 and S614).

Subsequently, in steps S615 to S620, page information is extracted from a database file subject to operation in response to selection of the start button in a manner similar to steps S468 to S473 in FIG. 16. Subsequently, the secure documents sharing service 210a requests a communication client unit 224a to acquire image data using an image identifier included in the page information thus extracted as a parameter (S621). The communication client unit 224a acquires the image data from the file server 2b based on the image identifier and returns the image data to the secure documents sharing service 210a (S622). The secure documents sharing service 210a saves the image data in a predetermined area of the HDD 633 of the multifunction machine 1a. When the image identifier is a path name, the secure documents sharing service 210a updates the image identifier of the page information in correspondence with the predetermined area inside HDD 633. When a plurality of page information pieces are acquired in step S620, steps S621 and S622 are repeated by the number of the plurality of pages.

The secure documents sharing service 210a returns the page information to the secure documents readout filter 104a (S623). Subsequently, the image data associated with the page information by the secure documents readout filter 104a, the edit filter 102a, and the print filter 103a are printed (S624). After the print is completed, the accumulated documents print job ends.

As described, according to the multifunction machine 1 of this embodiment, it is sufficient for a user to choose a storage or source destination using a registered name without paying attention to differences of communication methods depending on the storage and source destinations, a way of handling the documents data, and so on. Accordingly, it is possible to extremely improve convenience (operability) in saving and acquiring the documents data.

In this embodiment, there has been described about the cases where a SOAP, a FTP, or an SMB are used as the communication method (communication protocol) usable by an external device. However, the communication protocol usable by the external device is not limited thereto. In other words, the structures such as the external device setup screen 510 and the device setup information control table 2231 can be appropriately changed depending on the communication protocol usable by the external device.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

This patent application is based on Japanese Priority Patent Application No. 2008-278596 filed on Oct. 29, 2008, the entire contents of which are hereby incorporated herein by reference.

What is claimed is:

1. An image forming device connected to a plurality of external devices that controls image data through a network, the image forming device comprising:
 a setup unit configured to set up an identification name and communication identification information for each of the plurality of external devices;
 a registration unit configured to associate each of the identification names with corresponding communication identification information and to register each of the identification names and the corresponding communication identification information with a device information control unit;
 a source candidate display unit configured to display a list of the identification names registered with the device information control unit for selection as a candidate of a source from which the image data is acquired; and
 an acquisition unit configured to acquire the image data from one or more of the plurality of external devices based on the corresponding communication identification information associated with one of the identification names selected from the list,
 wherein each of the plurality of external devices controls bibliographic information related to the image data stored in each file having a same format,
 the plurality of external devices include a first external device configured to use a communication method, by which a predetermined interface associated with the file can be called, and a second external device that cannot use the communication method, by which the predetermined interface associated with the file can be called, and
 the acquisition unit is configured to:
 acquire the bibliographic information related to the image data from the first external device by calling the predetermined interface when it is determined that the external device is the first external device that can use the communication method, by which the predetermined interface associated with the file can be called,
 acquire the file from the second external device related to the communication identification information, when it is determined that the external device is the second external device that cannot use the communication method, by which the predetermined interface associated with the file can be called, and
 acquire the bibliographic information related to the image data from the acquired file.

2. The image forming device according to claim 1, wherein the setup unit is configured to set up the identification name and the communication identification information for the first external device of the plurality of external devices and the second external device of the plurality of external devices, the first external device using the communication method and the second external device using a communication method different from the communication method.

3. The image forming device according to claim 2,
 wherein the device information control unit is configured to save a database file of a form compatible with database files of the plurality of external devices and to save the acquired bibliographic information, which is bibliographic information that relates to respective image data controlled by the plurality of external devices,
 the image forming device further comprising:
 a database file acquisition unit configured to acquire one or more database files from respective one or more of the plurality of external devices based on the corresponding communication identification information associated with the identification name selected from the list;
 a database file decode unit configured to extract corresponding bibliographic information from the one or more database files acquired from the respective one or more of the plurality of external devices; and
 a bibliographic information acquisition unit configured to acquire the corresponding bibliographic information extracted from the one or more database files.

4. An image forming device connected to a plurality of external devices that controls image data through a network, the image forming device comprising:
 a setup unit configured to set up an identification name and communication identification information for each of the plurality of external devices;
 a registration unit configured to associate each of the identification names with corresponding communication identification information and to register each of the identification names and the corresponding communication identification information with a device information control unit;
a save destination candidate display unit configured to display a list of the identification names registered with the device information control unit as names for selection as a candidate of a save destination to which the image data is saved;
a sending unit configured to send a request for saving the image data to one or more of the plurality of external devices based on the corresponding communication identification information associated with one of the identification names selected from the list; and
an acquisition unit configured to acquire image data from one or more of the plurality of external devices based on communication identification information associated with one of the identification names selected from a source candidate list,
wherein each of the plurality of external devices controls bibliographic information related to the image data stored in each file having a same format,
the plurality of external devices include a first external device configured to use a communication method, by which a predetermined interface associated with the file can be called, and a second external device that cannot use the communication method, by which the predetermined interface associated with the file can be called, and
the acquisition unit is configured to:
acquire the bibliographic information related to the image data from the first external device by calling the predetermined interface when it is determined that the external device is the first external device that can use the communication method, by which the predetermined interface associated with the file can be called,
acquire the file from the second external device related to the communication identification information, when it is determined that the external device is the second external device that cannot use the communication method, by which the predetermined interface associated with the file can be called, and
acquire the bibliographic information related to the image data from the acquired file.

5. The image forming device according to claim 4, wherein the setup unit is configured to set up the identification name and the communication identification information for the first external device of the plurality of external devices and the second external device of the plurality of external devices, the first external device using the communication method and the second external device using a communication method different from the communication method.

6. The image forming device according to claim 5,
wherein the device information control unit is configured to save a database file of a form compatible with database files of the plurality of external devices and to save the acquired bibliographic information, which is bibliographic information that relates to respective image data controlled by the plurality of external devices,
the image forming device further comprising:
a database file acquisition unit configured to acquire one or more the database files from respective one or more of the plurality of external devices based on the corresponding communication identification information associated with the identification name selected from the list;
a database file update unit configured to register corresponding bibliographic information with the one or more database files acquired from the respective one or more of the plurality of external devices; and
a database file return unit configured to return the one or more database files registered with the corresponding bibliographic information to the respective one or more of the plurality of external devices.

7. The image forming device according to claim 5,
wherein the device information control unit is configured to save a database file of a form compatible with database files of the plurality of external devices and to save the acquired bibliographic information, which is bibliographic information that relates to respective image data controlled by the plurality of external devices,
the image forming device further comprising:
a bibliographic information sending unit configured to send corresponding bibliographic information and a request to each of the plurality of external devices requesting each of the plurality of external devices to register the corresponding bibliographic information in respective database files of the respective plurality of external devices based on the corresponding communication identification information associated with the identification name selected from the list.

8. An image data control method carried out by an image forming device connected to a plurality of external devices that controls image data through a network, comprising:
setting up an identification name and communication identification information for each of the plurality of external devices;
associating each of the identification names with corresponding communication identification information and registering each of the identification names and the corresponding communication identification information with a device information control unit;
displaying a list of the identification names registered with the device information control unit as names for selection as a candidate of a source from which the image data is acquired; and
acquiring the image data from one or more of the plurality of external devices based on the corresponding communication identification information associated with the identification name selected from the list,
wherein each of the plurality of external devices controls bibliographic information related to the image data stored in each file having a same format,
wherein the plurality of external devices include a first external device configured to use a communication method, by which a predetermined interface associated with the file can be called, and a second external device that cannot use the communication method, by which the predetermined interface associated with the file can be called, and
wherein said acquiring image data includes:
acquiring the bibliographic information related to the image data from the first external device by calling the predetermined interface when it is determined that the external device is the first external device that can use the communication method, by which the predetermined interface associated with the file can be called,
acquiring the file from the second external device related to the communication identification information, when it is determined that the external device is the second external device that cannot use the communication method, by which the predetermined interface associated with the file can be called, and
acquiring the bibliographic information related to the image data from the acquired file.

9. An image data control method carried out by an image forming device connected to a plurality of external devices that controls image data through a network, comprising:

setting up an identification name and communication identification information for each of the plurality of external devices;

associating each of the identification names with corresponding communication identification information and registering each of the identification names and the corresponding communication identification information with a device information control unit;

displaying a list of the identification names registered with the device information control unit as names for selection as a candidate of a save destination to which the image data is saved;

sending a request for saving the image data to one or more of the plurality of external devices based on the corresponding communication identification information associated with the identification name selected from the list; and acquiring image data from one or more of the plurality of external devices based on the corresponding communication identification information associated with the identification name selected from a source candidate list, wherein each of the plurality of external devices controls bibliographic information related to the image data stored in each file having a same format, wherein the plurality of external devices include a first external device configured to use a communication method, by which a predetermined interface associated with the file can be called, and a second external device that cannot use the communication method, by which the predetermined interface associated with the file can be called, and wherein said acquiring image data includes:

acquiring the bibliographic information related to the image data from the first external device by calling the predetermined interface when it is determined that the external device is the first external device that can use the communication method, by which the predetermined interface associated with the file can be called, acquiring the file from the second external device related to the communication identification information, when it is determined that the external device is the second external device that cannot use the communication method, by which the predetermined interface associated with the file can be called, and acquiring the bibliographic information related to the image data from the acquired file.

10. A non-transitory computer-readable storage medium storing computer-readable instructions thereon, which when executed by a computer included in an image forming device, cause the computer to perform the method of claim 8, the image forming device connected to a plurality of external devices that controls image data through a network, the image forming device comprising:

a setup unit configured to set up an identification name and communication identification information for each of the plurality of external devices;

a registration unit configured to associate each of the identification names with corresponding communication identification information and to register each of the identification names and the corresponding communication identification information with a device information control unit;

a source candidate display unit configured to display a list of the identification names registered with the device information control unit for selection as a candidate of a source from which the image data is acquired; and an acquisition unit configured to acquire the image data from one or more of the plurality of external devices based on the corresponding communication identification information associated with one of the identification names selected from the list, wherein each of the plurality of external devices controls bibliographic information related to the image data stored in each file having a same format, the plurality of external devices include a first external device configured to use a communication method, by which a predetermined interface associated with the file can be called, and a second external device that cannot use the communication method, by which the predetermined interface associated with the file can be called, and the acquisition unit is configured to:

acquire the bibliographic information related to the image data from the first external device by calling the predetermined interface when it is determined that the external device is the first external device that can use the communication method, by which the predetermined interface associated with the file can be called, acquire the file from the second external device related to the communication identification information, in a case where it is determined that the external device is the second external device cannot use the communication method, by which the predetermined interface associated with the file can be called, and acquire the bibliographic information related to the image data from the acquired filed.

11. A non-transitory computer-readable storage medium storing computer-readable instructions thereon, which when executed by a computer included in an image forming device, cause the computer to perform the method of claim 9, the image forming device connected to a plurality of external devices that controls image data through a network, the image forming device comprising:

a setup unit configured to set up an identification name and communication identification information for each of the plurality of external devices;

a registration unit configured to associate each of the identification names with corresponding communication identification information and to register each of the identification names and the corresponding communication identification information with a device information control unit;

a save destination candidate display unit configured to display a list of the identification names registered with the device information control unit as names for selection as a candidate of a save destination to which image data is saved;

a sending unit configured to send a request for saving the image data to one or more of the plurality of external devices based on the corresponding communication identification information associated with one of the identification names selected from the list; and an acquisition unit configured to acquire the image data from one or more of the plurality of external devices based on the corresponding communication identification information associated with one of the identification names selected from a source candidate list, wherein each of the plurality of external devices controls bibliographic information related to the image data stored in each file having a same format, the plurality of external devices include a first external device configured to use a communication method, by which a predetermined interface associated with the file can be called, and a second external device that cannot use the communication method, by which the predetermined interface associated with the file can be called, and the acquisition unit is configured to:

acquire the bibliographic information related to the image data from the first external device by calling the predetermined interface when it is determined that the external device is the first external device that can use the communication method, by which the predetermined interface associated with the file can be called, acquire the file from the second external device related to the communication identification information, in a case where it is determined that the external device is the second external device cannot use the communication method, by which the predetermined interface associated with the file can be called, and acquire the bibliographic information related to the image data from the acquired filed.

12. The image forming device according to claim 1, wherein the image forming device determines whether each of the one or more external devices associated with the selected identification name is one of a multifunction device and a file server, and prior to determining whether each of the one or more external devices associated with the selected identification name is one of a multifunction device and a file server, the image forming device determines whether the identification name selected from the list refers to said image forming device.

13. The image forming device according to claim 4, wherein the image forming device determines whether each of the one or more external devices associated with the selected identification name is one of a multifunction device and a file server, and prior to determining whether each of the one or more external devices associated with the selected identification name is one of a multifunction device and a file server, the image forming device determines whether the identification name selected from the list refers to said image forming device.

14. The image data control method according to claim 8, wherein the image forming device determines whether each of the one or more external devices associated with the selected identification name is one of a multifunction device and a file server, and prior to determining whether each of the one or more external devices associated with the selected identification name is one of a multifunction device and a file server, determining whether the identification name selected from the list refers to said image forming device.

15. The image data control method according to claim 9, wherein the image forming device determines whether each of the one or more external devices associated with the selected identification name is one of a multifunction device and a file server, and prior to determining whether each of the one or more external devices associated with the selected identification name is one of a multifunction device and a file server, the image forming device determines whether the identification name selected from the list refers to said image forming device.

* * * * *